United States Patent
Hosoya et al.

(10) Patent No.: US 9,501,676 B2
(45) Date of Patent: Nov. 22, 2016

(54) DATA MANAGEMENT DEVICE, CONTACTLESS STORAGE MEDIUM, AND DATA MANAGEMENT METHOD

(75) Inventors: Akihiro Hosoya, Shiga (JP); Yoji Takehiro, Kyoto (JP); Takeshi Miyamoto, Shiga (JP)

(73) Assignee: OMRON Corporation, Kyoto (JP)

( * ) Notice: Subject to any disclaimer, the term of this patent is extended or adjusted under 35 U.S.C. 154(b) by 297 days.

(21) Appl. No.: 14/236,335

(22) PCT Filed: Mar. 13, 2012

(86) PCT No.: PCT/JP2012/056480
§ 371 (c)(1),
(2), (4) Date: Mar. 21, 2014

(87) PCT Pub. No.: WO2013/021673
PCT Pub. Date: Feb. 14, 2013

(65) Prior Publication Data
US 2014/0292498 A1    Oct. 2, 2014

(30) Foreign Application Priority Data
Aug. 9, 2011    (JP) .................................. 2011-174408

(51) Int. Cl.
G06K 7/10      (2006.01)
G06Q 10/00     (2012.01)
G06Q 50/10     (2012.01)

(52) U.S. Cl.
CPC ........... *G06K 7/10366* (2013.01); *G06Q 10/00* (2013.01); *G06Q 50/10* (2013.01)

(58) Field of Classification Search
CPC ........ G07C 3/08; G07C 5/008; G07C 5/085; G06F 11/0748; G06F 11/0766
See application file for complete search history.

(56) References Cited

U.S. PATENT DOCUMENTS

| 2005/0159823 | A1 | 7/2005 | Hayes et al. |
| 2005/0242925 | A1 | 11/2005 | Zaretsky et al. |
| 2006/0091207 | A1 | 5/2006 | Chang |

(Continued)

FOREIGN PATENT DOCUMENTS

| JP | 2004-310755 A | 11/2004 |
| JP | 2005-242628 A | 9/2005 |
| JP | 2006-024083 A | 1/2006 |

(Continued)

OTHER PUBLICATIONS

International Search Report issued in PCT/JP2012/056480 mailed on Apr. 17, 2012 (2 pages).

(Continued)

*Primary Examiner* — Nabil Syed
(74) *Attorney, Agent, or Firm* — Osha Liang LLP

(57) ABSTRACT

A data management device configured to manage data stored in a contactless storage medium mounted to an electronic apparatus has a data storage unit that stores a plurality of data units including information of the electronic apparatus, a state detection unit that detects a state of the electronic apparatus, a data selection unit that, by referring to selection rules associating states of the electronic apparatus with types of the data, selects data comprising information conforming with the electronic apparatus under a state detected by the state detection unit from the data storage unit, and a data management unit that stores the data selected by the data selection unit in the contactless storage medium.

18 Claims, 27 Drawing Sheets

(56) References Cited

U.S. PATENT DOCUMENTS

2006/0197667 A1 9/2006 Jung
2010/0283573 A1 11/2010 Yum et al.

FOREIGN PATENT DOCUMENTS

| | | |
|---|---|---|
| JP | 2006-184990 A | 7/2006 |
| JP | 2007-052750 A | 3/2007 |
| JP | 2008-015838 A | 1/2008 |
| JP | 2010-113450 A | 5/2010 |

OTHER PUBLICATIONS

Extended European Search Report issued in corresponding European Application No. 12821716.3, mailed on Mar. 9, 2015 (8 pages).

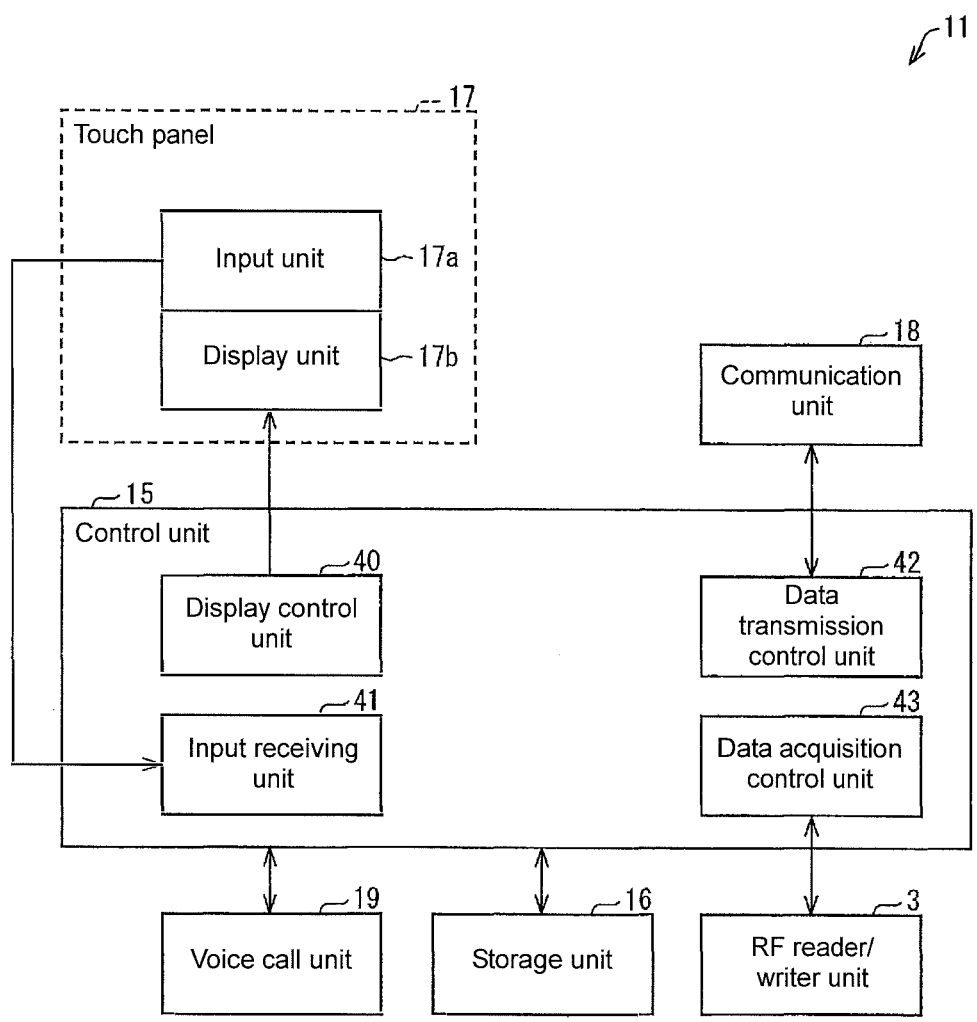

Fig. 8

| Detected state | | Type of data |
|---|---|---|
| Normal operating state | | Instruction manual data |
| Error state | Does not operate | Error recovery guide data A |
| | Cannot spin-dry | Error recovery guide data B-1 |
| | | Error recovery guide data B-2 |
| | Water is not supplied | Error recovery guide data C |
| | Needs repair | Error recovery guide data D |

Fig. 9

| Type of data | Data |
|---|---|
| Instruction manual data | PDF data 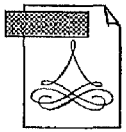 |
| Error recovery guide data A | Text data<br><br>Have you pressed "start"? Turn "off" the power then turn it "on" again to reset the machine, and then press "start". |
| Error recovery guide data B-1 | Text data<br><br>Is the machine door left open? Close the machine door. The machine will start spin drying. |
| Error recovery guide data B-2 | Text data<br><br>Aren't clothes in the tub unbalanced? Rearrange the clothes such that they are balanced, and close the machine door, then press "start" |
| Error recovery guide data C | Text data + Moving image data ~50<br><br>Isn't water inlet filter clogged? Turn "off" the power and clear the filter, then turn it "on" again and press "start".  ~51 |
| Error recovery guide data D | Text data<br><br>Needs repair. Unplug the power cord for a safety precaution and contact your dealer. |

Fig. 12

| Total operation hours | Total operation days | |
|---|---|---|
| 70.5 hours | 85 days | } 52 |
| Date | Time | Event |
| ⋮ | ⋮ | ⋮ |
| 2011/3/1 | 10:08 | Operate |
| 2011/3/1 | 11:32 | Operate |
| 2011/3/1 | 11:38 | Error "water is not supplied" |
| 2011/3/2 | 10:10 | Operate |
| ⋮ | ⋮ | ⋮ |
| 2011/3/20 | 13:21 | Filter replacement |
| 2011/3/21 | 10:25 | Operate |
| ⋮ | ⋮ | ⋮ |
| 2011/6/10 | 9:55 | Error "type Y" |
| 2011/6/10 | 10:30 | Filter replacement |
| ⋮ | ⋮ | ⋮ |

| Detected state | Type of data |
|---|---|
| Total operation hours are 70 hours or more or total operation days are 90 days or more | Error recovery guide data A |
| Two weeks or more has passed after the last filter replacement | Error recovery guide data F |
| Error "type X" has occurred for five times or more or twice or more a week | Error recovery guide data G |
| Error "type P" has occurred | Error recovery guide data H-1 |
| Error "type P" → error "type Q" have occurred | Error recovery guide data H-2 |
| Error "type P" → error "type Q" → error "type R" have occurred | Error recovery guide data H-3 |
| No error has occurred | Instruction manual data |

(H-1, H-2, H-3 rows braced as 54)

Fig. 16

| Detected state | Type of data |
|---|---|
| Error with highest number of occurrences is "does not operate" | Error recovery guide data A |
| Error with highest number of occurrences is "cannot spin-dry" | Error recovery guide data B-1 |
| | Error recovery guide data B-2 |
| Error with highest number of occurrences is "water is not supplied" | Error recovery guide data C |
| Error with highest number of occurrences is "needs repair" | Error recovery guide data D |
| Error with highest number of occurrences is "type X" | Error recovery guide data G |
| Error with highest number of occurrences is "type P", "type Q", or "type R" | Error recovery guide data H-1 |
| | Error recovery guide data H-2 |
| | Error recovery guide data H-3 |
| No error has occurred | Instruction manual data |

DATA MANAGEMENT DEVICE, CONTACTLESS STORAGE MEDIUM, AND DATA MANAGEMENT METHOD

BACKGROUND

Technical Field

The present invention relates to a data management device for managing data of an electronic apparatus, a contactless storage medium, an electronic apparatus equipped with the data management device and the contactless storage medium, an apparatus user support system, a data management method, a control program, and a recording medium.

Related Art

A near-field radio communication technology which enables contactless data communication between a contactless IC tag (or card or the like) and an RF reader/writer via an antenna, a so-called RFID (Radio Frequency IDentification) technology has been widely used.

As IC tags (cards) have been made more compact and thinner, they have been used for various portable small objects (such as a credit card, a cash card, an Electronic Toll Collection (ETC) card, a commuter pass, an electronic money card, an identification card). Data is read from the IC tags by fixed RF reader/writer devices such as automatic ticket gates at railway stations.

Other than those examples, technologies improving user convenience by applying the RFID technology have been disclosed in Patent Documents 1 to 4, for example. Patent Documents 1 to 4 disclose installing technologies for IC tags or RF readers/writers in target apparatuses to be used by users (for example, commodities or household electrical appliances) to enable the target apparatuses to communicate with communication terminals (cellular phones or the like). The communication terminals communicate with the target apparatuses to acquire and use data held in the target apparatuses. For example, the communication terminals display and present the acquired data to the users, and also supply the acquired data to external apparatuses or acquire another data from external apparatuses based on the acquired data. The communication terminals function as user support devices, so to speak, which help and support users in using the target apparatuses, and improve convenience for the users in using the target apparatuses.

For example, Patent Document 1 discloses an information providing system. In the information providing system, a terminal device (user support device) reads an ID identifying a commodity (target apparatus) from an information providing medium (IC tag) mounted to the commodity, acquires commodity information from a database in a server (external apparatus) based on the read ID, and displays the acquired commodity information.

For example, Patent Document 2 discloses a household electrical appliance. An rice cooker (target apparatus) as the household electrical appliance is configured to access the Internet via an information terminal (user support device) and download rice information from a corresponding website to update a control program and data when no rice information is read from a non-contact information storage medium (IC tag) attached to a rice packing bag.

For example, Patent Document 3 discloses a method of having an IC tag that stores instruction manual data (image, sound, text, etc.) attached to a household electrical appliance or the like (target apparatus), allowing a cellular phone or the like (user support device) to read the instruction manual data from the IC tag and display the data.

For example, Patent Document 4 discloses a product information management system. The system responds to an occurrence of a trouble in an air conditioner (target apparatus) and causes a controller to write trouble information in a tag section (IC tag) attached to the air conditioner, allow a portable terminal (user support device) to read information from the tag section and transmit the read information including trouble information and product information to a management server (external apparatus) of a manufacturer or a dealer.

Patent Document 1 Japanese Unexamined Patent Publication No. 2004-310755 (published on Nov. 4, 2004)

Patent Document 2 Japanese Unexamined Patent Publication No. 2005-242628 (published on Sep. 8, 2005)

Patent Document 3 Japanese Unexamined Patent Publication No. 2007-052750 (published on Mar. 1, 2007)

Patent Document 4 Japanese Unexamined Patent Publication No. 2008-015838 (published on Jan. 24, 2008)

SUMMARY

In the configuration of Patent Document 1, the contents of the commodity information acquired from the server are fixed and unchangeable. Therefore, the user may not necessarily be able to acquire the most needed information according to usage conditions of the commodity at once.

In the configuration of Patent Document 2, the RF reader/writer is configured to be installed in the rice cooker. Then, the RF reader/writer needs to be energized by the rice cooker to acquire necessary data from the non-contact information storage medium. Therefore, on the condition that the power supply is cut off as a result of a breakdown of the rice cooker or a power failure, the information terminal is unable to read the necessary data stored in the non-contact information storage medium via the rice cooker.

In the household electrical appliance described in Patent Document 3, the data stored in the tag or the like is fixed as in the configuration of Patent Document 1, and contents of data available for the cellular phone or the like cannot be made variable according to the state of the household electrical appliance. Therefore, with the method described in Patent Document 3, the user is not necessarily able to acquire the most needed information according to usage conditions of the household electrical appliance at once.

Although Patent Document 4 discloses a technology causing the portable terminal to transmit trouble information to the management server, it does not describe that the system responds to an occurrence of a trouble in the air conditioner by causing the portable terminal to read necessary information of an action the user should take from the IC tag. Therefore, the user is unable to acquire the most needed information according to usage conditions of the air conditioner at once.

Moreover, RF reader modules may be installed in multifunctional communication terminals such as cellular phones and smart phones in the future; therefore, there will be more uses of portable communication terminals such that a user reads out data stored in the IC tag and uses (displays) the data on the portable communication terminals.

The standards for near-field radio communication on devices have been different between Japan and other countries and FeLiCa (registered trademark) has been mainly accepted in Japan and Mifare (registered trademark) has been mainly accepted in other countries. However, in recent years, there is a movement to establish unified standards called NFC (Near Field Communication). NFC is near-field radio communication standards and it is possible for devices equipped with NFC enabled IC chips to identify each other and exchange data with each other only by bringing the devices into close proximity (for example, 10 cm).

As the uses will be varied and the standards will be unified, the RFID technologies will be used more widely in everyday applications so that RFID enabled devices will come into use more widely and be more familiar and convenient to general users.

Therefore, it will be more important to enhance user convenience by applying the RFID technology.

One or more embodiments of the present invention provides a data management device for managing data to immediately present necessary information to a user according to the state of electronic apparatus, a contactless storage medium, an electronic apparatus equipped with the data management device and the contactless storage medium, an apparatus user support system, a data management method, a control program, and a recording medium.

A data management device according to one or more embodiments of the present invention is a data management device for managing data stored in a contactless storage medium mounted to an electronic apparatus, is provided with: a data storage unit for storing a plurality of data units including information of the electronic apparatus; a state detection unit for detecting a state of the electronic apparatus; a data selection unit which, by referring to selection rules associating states of the electronic apparatus with types of the data, selects data including information conforming with the electronic apparatus under a state detected by the state detection unit from the data storage unit; and a data management unit for storing the data selected by the data selection unit in the contactless storage medium.

A data management method according to one or more embodiments of the present invention is a data management method for managing data stored in a contactless storage medium mounted to an electronic apparatus, in which the electronic apparatus is provided with a data storage unit configured to store a plurality of data units including information of the electronic apparatus, and the method includes: a state detection step of detecting a state of the electronic apparatus; a data selection step of, by referring to selection rules associating states of the electronic apparatus with types of the data, selecting data including information conforming with the electronic apparatus under a state detected in the state detection step from the data storage unit; and a data storing step of storing the data selected in the data selection step in the contactless storage medium.

According to the above described configuration and method, first, the state detection unit detects the state of the electronic apparatus. Then, the data selection unit selects data to be stored in the contactless storage medium according to the detected state of the electronic apparatus. The data selection unit selects data according to the selection rules. The selection rules are information supplied to the data selection unit about what kind of data needs to be selected for what kind of state the electronic apparatus has. Specifically, the selection rules are, for example and without limitation, information indicating corresponding relations between the states which can be detected in the electronic apparatus and the plurality of stored data units. The data selection unit can identify data to be selected according to the state of the electronic apparatus detected by the state detection unit by referring to the selection rules, therefore, selects the corresponding data from the data storage unit. That is, the data selection unit can select appropriate data including information conforming with the electronic apparatus under the detected specific state from the data storage unit by referring to the selection rules. Finally, the data management unit stores the data selected by the data selection unit in the contactless storage medium.

As a result, the contactless storage medium always stores data including information of contents conforming with the detected state of the electronic apparatus. The data of contents conforming with the state of the electronic apparatus includes information currently needed by the user who is using the electronic apparatus under that state. The "data of contents conforming with the state of the electronic apparatus" may be, for example and without limitation, essential data, i.e., text data, document data, image data, audio data, moving image data, and a complex data which is a combination of these types of data describing the electronic apparatus under the state. Alternatively, the "data of contents conforming with the state of the electronic apparatus" may include a data ID, a data name, and a URL for identifying, indicating the location of, and describing how to acquire each unit of the above described essential data.

Therefore, the data management device can manage data to immediately present necessary information to a user according to the state of electronic apparatus. Therefore, the data management device has an effect of enabling user convenience to be improved in the use of the electronic apparatus.

A data management device according to one or more embodiments of the present invention is a data management device for managing data stored in a contactless storage medium mounted to an electronic apparatus, is provided with: a data storage unit for storing a plurality of data units including information of the electronic apparatus; a state detection unit for detecting a state of the electronic apparatus; a data selection unit which, by referring to selection rules associating states of the electronic apparatus with types of the data, selects data including information conforming with the electronic apparatus under a state detected by the state detection unit from the data storage unit; and a data management unit for storing the data selected by the data selection unit in the contactless storage medium.

A data management method according to one or more embodiments of the present invention is a data management method for managing data stored in a contactless storage medium mounted to an electronic apparatus, in which the electronic apparatus is provided with a data storage unit configured to store a plurality of data units including information of the electronic apparatus, and the method includes: a state detection step of detecting a state of the electronic apparatus; a data selection step of, by referring to selection rules associating states of the electronic apparatus with types of the data, selecting data including information conforming with the electronic apparatus under a state detected in the state detection step from the data storage unit; and a data storing step of storing the data selected in the data selection step in the contactless storage medium.

Therefore, the data management device and the data management method have effects of managing data to immediately present necessary information to the user according to the state of the electronic apparatus.

BRIEF DESCRIPTION OF THE DRAWINGS

FIG. 4 is a functional block diagram illustrating a configuration of a main part of the communication terminal according to one or more embodiments of the present invention;

FIG. 5 is a table listing a specific example of selection rules stored in a selection rule storage unit of the data management device;

FIG. 8 is a table listing a specific example of selection rules stored in a selection rule storage unit of a data management device according to one or more embodiments of the present invention;

FIG. 9 is a table listing specific examples of data stored in a data storage unit of the data management device;

FIG. 12 is a table listing a specific example of results monitored by a state monitoring unit and stored in a state history storage unit of the data management device;

FIG. 13 is a table listing a specific example of selection rules stored in a selection rule storage unit of the data management device;

FIG. 16 is a table listing another specific example of selection rules stored in the selection rule storage unit;

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In the below description, a data management device according to one or more embodiments of the present invention is installed in an electronic apparatus, i.e., a target apparatus, by way of example. Also, the electronic apparatus and a communication terminal owned by a user of the electronic apparatus form an error recovery support system, by way of example. The error recovery support system supports a user in removing an error (trouble, failure) from the electronic apparatus. In the error recovery system, the communication terminal of the user functions as a user support device.

[Outline of Error Recovery Support System]

Figure 2:
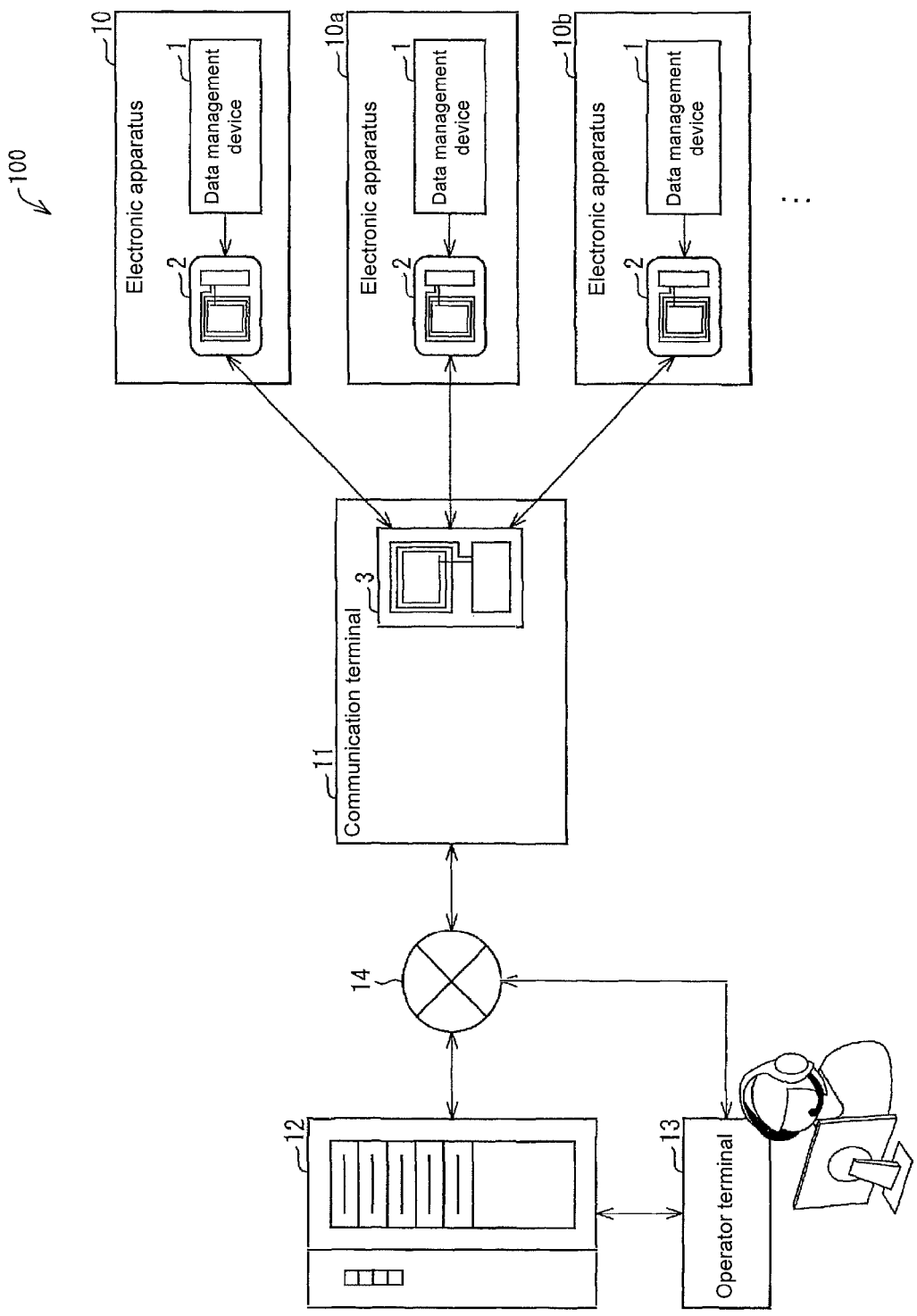
FIG. 2 is a diagram illustrating an outline of an error recovery support system according to one or more embodiments of the present invention.

FIG. 2 is a diagram illustrating an outline of an error recovery support system 100 according to one or more embodiments of the present invention.

As illustrated in FIG. 2, the error recovery support system 100 includes at least an electronic apparatus 10 as the target apparatus and a communication terminal 11 as the user support device. The error recovery support system 100 may further include electronic apparatuses (10a, 10b, . . . ) other than the electronic apparatus 10 as the target apparatus. Any apparatus may be the electronic apparatus as far as it operates on a power supply to fulfill a specific function. The electronic apparatus include, for example without limitation, a clothes washing machine, a rice cooker, a refrigerator, an air conditioner, a vacuum cleaner, a digital television, a DVD recorder, a personal computer, a game player, and the like. Here, the electronic apparatus 10 is, for example, a clothes washing machine having functions of automatically washing and drying clothes.

In the error recovery support system 100, the electronic apparatus 10 is equipped with a data management device 1 according to one or more embodiments of the present invention and embedded with an IC tag 2. The IC tag 2 stores various types of data about the electronic apparatus 10, which enables the IC tag 2 to be read by placing an RF reader (RF reader/writer) module near the IC tag 2.

The communication terminal 11 has an RF reader/writer unit 3 that functions as the RF reader (RF reader/writer) module. The communication terminal 11 is capable of reading data from the IC tag 2 of the electronic apparatus 10.

Here, the communication terminal 11 is a multi-functional communication terminal, i.e., a so-called smart phone, without limitation.

The communication terminal 11 supports the user in using the electronic apparatus 10 by processing the data read from the IC tag 2 and presenting the processed data to the user or supplying the processed data to an external apparatus. For example, on the condition that the IC tag 2 stores information useful for the user such as how to use the electronic apparatus 10 and how to recover from errors, the user can access the useful information about the electronic apparatus 10 by using the communication terminal 11.

Figure 3:
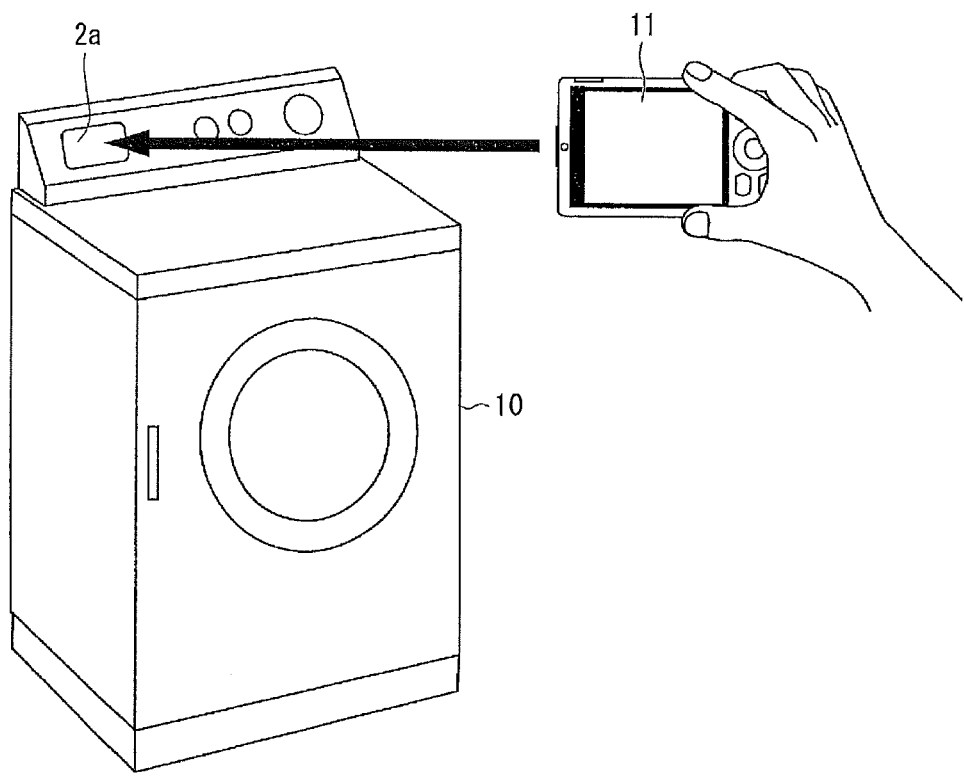
FIG. 3 is a diagram describing the electronic apparatus and a communication terminal in near-field radio communication with each other in the error recovery support system.

The communication terminal 11 according to one or more embodiments of the present invention is a highly portable and compact communication device. Even with a fixed large electronic apparatus 10, the communication terminal 11 can easily read the data from the IC tag 2 only by being held by the user to hold the terminal over the electronic apparatus 10. For example, as illustrated in FIG. 3, the user holds the communication terminal 11 over an accessible surface 2a of the electronic apparatus 10 embedded with the IC tag 2. That enables the RF reader/writer unit 3 of the communication terminal 11 to communicate with the IC tag 2.

Further, with a function of communicating with an external apparatus, the communication terminal 11 can easily transfer the data read from the IC tag 2 to that external apparatus.

The error recovery support system 100 may further include a management server 12 and an operator terminal 13 which are owned by the manufacturer or the like of the electronic apparatus 10 as an example of the external apparatus. The management server 12 stores information of the electronic apparatus that needs to be repaired and information of the user. The operator terminal 13 is used by an operator who assists error recovery by giving voice information. The operator terminal 13 is used by the operator in exchanging information with the user. The management server 12 and the operator terminal 13 function as a call center.

In one or more embodiments of the present invention, the communication terminal 11 is capable of communicating with the management server 12 and the operator terminal 13 via the Internet and/or a wide area communication network 14 such as a cellular network. For example, on the condition that the IC tag 2 stores information about the state of the electronic apparatus 10 and the like gathered at when an error occurs, the user can easily transfer information useful for error recovery of the electronic apparatus 10 to the management server 12 or the operator terminal 13 via the communication terminal 11.

Meanwhile, the management server 12 and the operator terminal 13 may be enabled to communicate with each other via the wide area communication network 14 or via a LAN (Local Area Network) or the like.

[Configuration of Communication Terminal]

FIG. 4 is a functional block diagram illustrating a configuration of a main part of the communication terminal 11 according to one or more embodiments of the present invention.

As illustrated in FIG. 4, the communication terminal 11 has at least a control unit 15, a storage unit 16, a touch panel 17, a communication unit 18, a voice call unit 19, and an RF reader/writer unit 3 as its hardware configuration in brief outline. The communication terminal 11 may further have an external interface, a voice output unit, a voice input unit, a camera unit, a broadcast receiver (tuner, demodulator, and the like), a GPS, a sensor (an acceleration sensor, a tilt sensor, and the like) and other various parts which are provided for smartphones, (not shown) as standard equipment.

The touch panel 17 functions as an input device and a display device of the communication terminal 11. Specifically, the touch panel 17 includes an input unit 17a and a display unit 17b. The input unit 17a is for the user to input a command signal for controlling the communication terminal 11 via a touch panel. The input unit 17a includes a touch surface to be touched (approached) by a touch (or an approach) of a control tool such as a finger or a stylus and a touch sensor for detecting a touched (approached) position on the touch surface. The display unit 17b displays a display object (text, image, moving image, GUI (Graphical User Interface) screen, and the like) on which the communication terminal 11 has performed information processing. The display unit 17b is, for example, a display device such as a LCD (liquid crystal display). As illustrated in FIG. 4, the input unit 17a and the display unit 17b are integrally formed and form the touch panel 17.

The communication unit 18 is to perform data communication with an external device via the wide area communication network 14. For example, the communication unit 18 transmits and receives electronic mail data or the like to and from an external device via a mobile telephone network.

The voice call unit 19 realizes a telephone call between the user of the communication terminal 11 and a user of another telephone set by performing call request processing and call-in processing and also by processing voice call data exchanged between the terminal and the telephone set via a mobile telephone network.

The RF reader/writer unit 3 reads data from and writes data to a memory of the IC tag 2. The RF reader/writer unit 3 includes an antenna unit for receiving electromagnetic waves from the IC tag 2 and respective circuits for controlling modulation and demodulation as well as transmission and reception of data. Incidentally, in the case where information needs not to be particularly written from the communication terminal 11 to the electronic apparatus 10, the RF reader/writer unit 3 may be replaced by a RF reader unit.

The storage unit 16 stores (1) a control program to be executed by the control unit 15 of the communication terminal 11, (2) an OS program, (3) application programs by which the control unit 15 performs various functions of the communication terminal 11, and (4) various kinds of data to be read when the application programs are executed. Alternatively, the storage unit 16 stores (5) data to be used by the control unit 15 in computation in the process of performing the various functions, results of the computation, and the like. For example, the data of (1) to (4) is stored in a non-volatile storage such as a ROM (read only memory), a flash memory, an EPROM (Erasable ROM), an EEPROM (Electrically EPROM), an NVRAM (non-Volatile random access memory). For example, the data of (5) is stored in a volatile storage such as a RAM (Random Access Memory). A decision of which data is to be stored in which storage is made based on the use purpose, convenience, cost, physical restrictions of the communication terminal 11 as required.

The control unit 15 performs integrated control of the respective units of the communication terminal 11. The control unit 15 is formed of, for example, a CPU (central processing unit) or the like. The functions of the communication terminal 11 are realized by the CPU as the control unit 15 reading the programs out from the ROM or the like into the RAM or the like and executing them. The control unit 15 includes a display control unit 40, an input receiving unit 41, a data transmission control unit 42, and a data acquisition control unit 43 as functional blocks. The details of the respective functions realized by the respective functional blocks will be described later with reference to other figures. Although not shown, the control unit 15 may include an application execution unit for executing the respective application programs.

The above described respective functional blocks of the control unit 15 represent a software configuration of the communication terminal 11. An arithmetic processing unit such as a CPU or the like can realize the functional blocks by reading programs out from a non-volatile storage formed of a ROM or the like into a RAM or the like (not shown) and executing them.

[Configuration of Data Management Device (Electronic Apparatus)]

Figure 1:
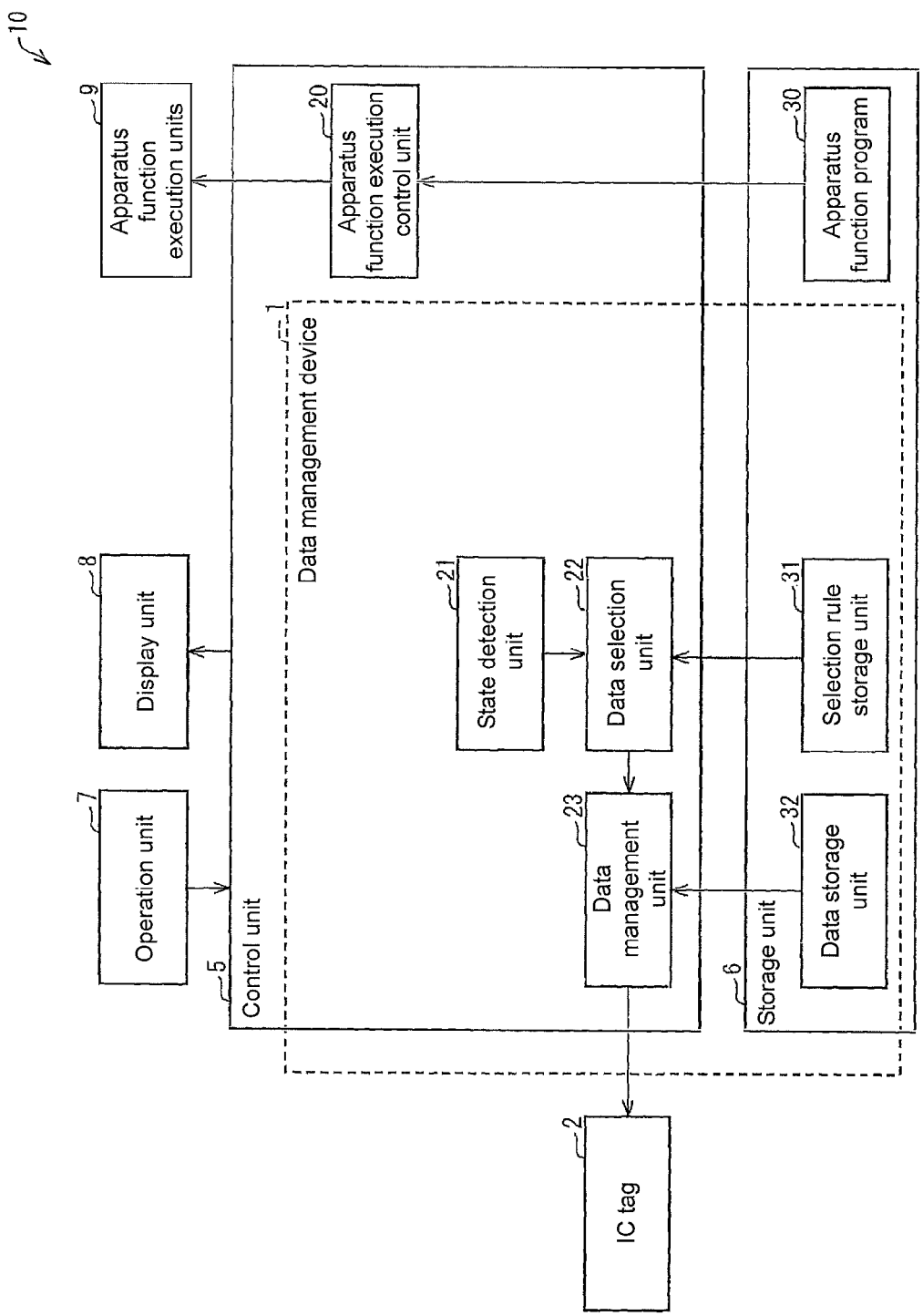
FIG. 1 is a functional block diagram illustrating a configuration of a main part of an electronic apparatus, particularly, a data management device according to one or more embodiments of the present invention.

FIG. 1 is a functional block diagram illustrating a configuration of a main part of the electronic apparatus 10, particularly, the data management device 1 according to one or more embodiments of the present invention.

As illustrated in FIG. 1, the electronic apparatus 10 has a control unit 5, a storage unit 6, an IC tag 2, an operation unit 7, a display unit 8, and respective apparatus function execution units 9 as its hardware configuration in brief outline.

The IC tag 2 transmits and receives data to the RF reader/writer unit 3 of the communication terminal 11 by communicating with the RF reader/writer unit 3. The IC tag 2 includes a memory for storing data, an antenna unit for transmitting electromagnetic waves to the RF reader/writer unit 3, and various circuits for controlling modulation and demodulation as well as transmission and reception of data. In one or more embodiments of the present invention, the IC tag 2 does not contain a battery, and the power supply circuit of the IC tag 2 obtains power to drive the IC tag 2 by causing electromagnetic induction by electromagnetic waves from the antenna unit of the RF reader/writer unit 3. Therefore, the IC tag 2 is always ready to have its data read out only on the condition that it is in close vicinity to the RF reader/writer unit 3 of the communication terminal 11, irrespective of depletion of batteries or no power supply to the electronic apparatus 10 embedded with the IC tag 2.

The operation unit 7 is used for the user to input a command signal to the electronic apparatus 10. The operation unit 7 includes buttons, a touch panel, and a touch sensor, or appropriate input devices such as a voice input unit and a voice recognition unit.

The display unit 8 displays an operation screen for the user to control the electronic apparatus 10 as a GUI screen. The display unit 8 includes, for example, a display device such as a LCD (liquid crystal display). A decision of what kind of display device in which size is used as the electronic apparatus is made based on the use purpose, convenience, cost, and physical restrictions of the electronic apparatus as required.

Here, the electronic apparatus 10 has apparatus function execution units 9 as its hardware configuration for performing specific functions that are essential features of the electronic apparatus. In the case where the electronic apparatus 10 is a clothes washing machine, the apparatus function execution units 9 are, for example, a washing machine tub, a spin tub unit, a drying unit, a water supply unit, and a drain unit.

The storage unit 6 stores (1) a control program to be executed by the control unit 5, (2) an OS program, (3) application programs by which the control unit 5 performs various functions of the electronic apparatus 10, and (4) various kinds of data to be read when the application programs are executed. Alternatively, the storage unit 6 stores (5) data to be used by the control unit 5 in computation in the process of performing the various functions, results of the computation, and the like.

As for the data of (3) and (4), the storage unit 6 stores particularly the respective programs and data to be read by the data management device 1 installed in the electronic apparatus 10 to realize data management functions the data management device performs. Specifically, the storage unit 6 includes a data storage unit 32 and a selection rule storage unit 31.

Further, for example, the data of (1) to (4) is stored in a non-volatile storage such as a ROM (read only memory), a flash memory, an EPROM (Erasable ROM), an EEPROM (Electrically EPROM), an NVRAM (non-Volatile random access memory). For example, the data of (5) is stored in a volatile storage such as a RAM (Random Access Memory). A decision of which data is to be stored in which storage is made based on the use purpose, convenience, cost, physical restrictions of the electronic apparatus 10 as required.

Meanwhile, as for the data of (3) and (4), the storage unit 6 may store apparatus function program 30 and data for realizing a specific function other than the data management functions (for example, a fully automatic clothes washing function) to be performed by the electronic apparatus 10.

The control unit 5 performs integrated control of the respective units of the electronic apparatus 10, and has at least a state detection unit 21, a data selection unit 22, and a data management unit 23 as functional blocks. These functional blocks represent a software configuration which functions as the data management device 1 in the electronic apparatus 10. A CPU can realize the above described respective functional blocks of the control unit 5 by reading programs of the data management functions out from the storage (the storage unit 6) formed of a ROM, an NVRAM, or the like into a RAM (random access memory) or the like (not shown) and executing them. Configurations and operation of the respective units which function as the data management device 1 will be detailed later with reference to another figure.

Meanwhile, the control unit 5 of the electronic apparatus 10 may further include an apparatus function execution control unit 20 as a functional block. The apparatus function execution control unit 20 represents a software configuration for the electronic apparatus 10 to realize specific functions other than the data management functions (for example, fully automatic clothes washing functions). A CPU can realize the apparatus function execution control unit 20 by reading the apparatus function program 30 out from the storage (the storage unit 6) formed of a ROM, an NVRAM, or the like into a RAM (random access memory) or the like (not shown) and executing the program 30 to control and drive the apparatus function execution units 9. Since the configuration and operation essential to the electronic apparatus 10 (the apparatus function execution units 9, the apparatus function execution control unit 20, and the apparatus function program 30) are the same as those for well-known general functions of existing electronic apparatuses, detailed description of them will be omitted.

[Functional Composition of Data Management Device]

As illustrated in FIG. 1, the control unit 5 which functions as the data management device 1 has the state detection unit 21, the data selection unit 22, and the data management unit 23 as functional blocks.

The state detection unit 21 detects a state of the electronic apparatus 10 according to operation situations of the respective units of the electronic apparatus 10 (particularly, the apparatus function execution units 9 and the apparatus function execution control unit 20).

In one or more embodiments of the present invention, the state detection unit 21 detects the state of the electronic apparatus 10 after the state of the electronic apparatus 10 changes. More specifically, the state detection unit 21 detects whether the electronic apparatus 10 (particularly, the apparatus function execution units 9) is operating without any problem or the electronic apparatus has a trouble or failure. Hereinafter, the former state will be referred to as a "normal operating state" and the latter state will be referred to as an "error state".

The data selection unit 22 selects data to be stored in the IC tag 2 according to the state of the electronic apparatus 10 detected by the state detection unit 21. The data selection unit 22 selects data to be stored in the IC tag 2 from among the data stored in the data storage unit 32 according to the selection rules stored in the selection rule storage unit 31. In one or more embodiments of the present invention, it is assumed that the data storage unit 32 stores "instruction manual data" indicating how to use the electronic apparatus 10 and "error recovery guide data" indicating how to remove errors in case in which an error occurs in the electronic apparatus 10.

FIG. 5 is a table listing a specific example of selection rules stored in the selection rule storage unit 31.

As shown in FIG. 5, the table of the selection rules associates each state detected by the state detection unit 21 with a type of data corresponding to the state. Specifically, the state "normal operating state" is associated with the type of data "instruction manual data" and the state "error state" is associated with the type of data "error recovery guide data".

Meanwhile, the selection rules are shown in a data structure of table only by way of example and it is not intended to limit the data structure of the selection rules to that. The selection rules may be stored in any data structure as far as the data structure enables the data selection unit 22 to identify the corresponding relations between the states detected by the state detection unit 21 and data to be selected.

The data selection unit 22 selects data to be stored in the IC tag 2 according to the type of data associated with the state detected by the state detection unit 21 by referring to the selection rules. The data selection unit 22 notifies the data management unit 23 of the type of the selected data.

The data management unit 23 manages data to be stored in a memory of the IC tag 2. Specifically, the data management unit 23 reads data corresponding to the type of the data selected by the data selection unit 22 out from the data storage unit 32 and stores the data in the memory of the IC tag 2. Alternatively, the data management unit 23 may delete unused data from the memory of the IC tag 2 as required.

[Processing Flow of Data Management Device]

Figure 6:
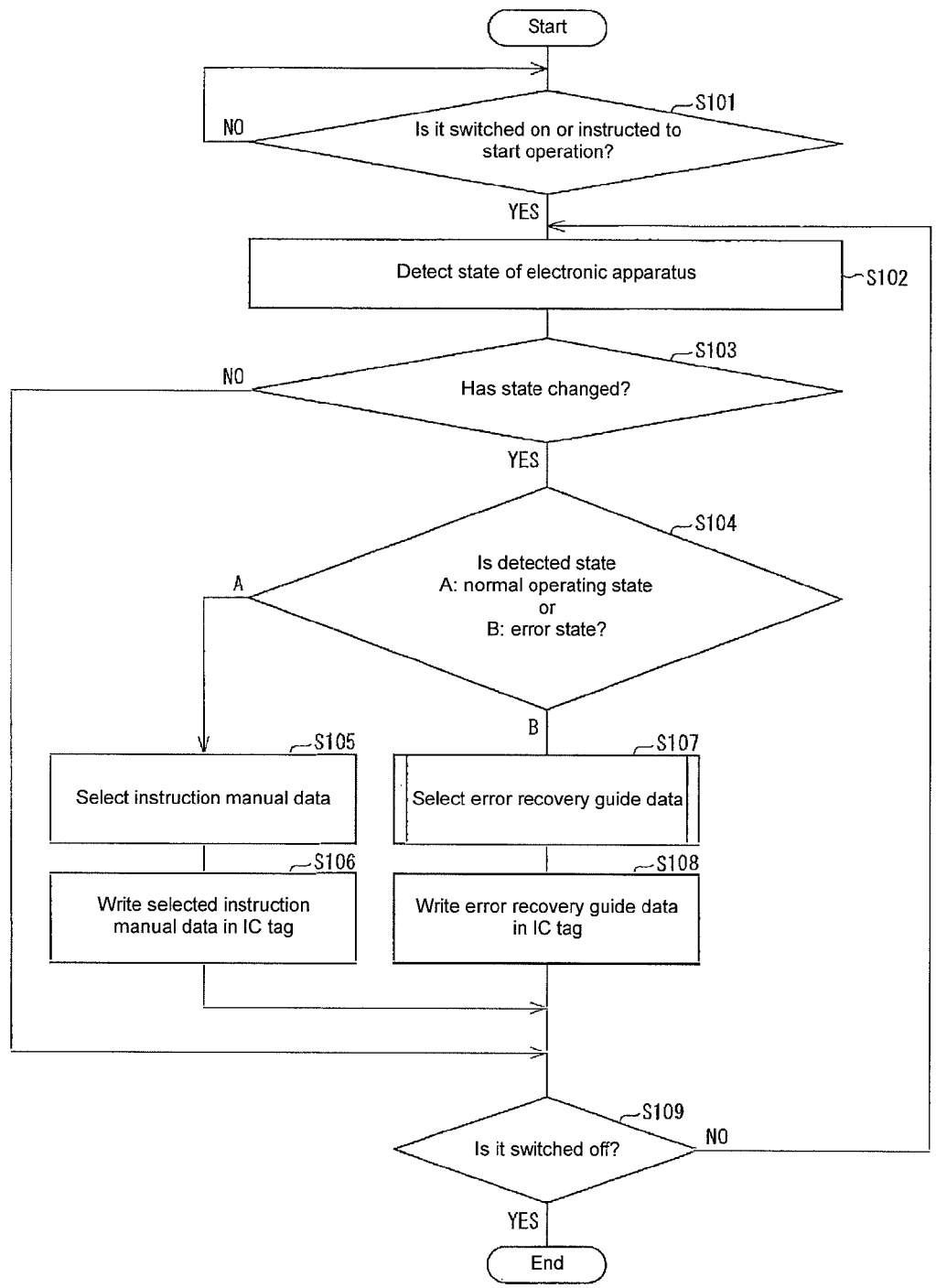
FIG. 6 is a flow chart showing a processing flow of the data management device.

FIG. 6 is a flow chart showing a processing flow of the data management device 1 installed in the electronic apparatus 10.

When the operation unit 7 of the electronic apparatus 10 is controlled to make a Power On switch pressed, the electronic apparatus 10 is switched on. Alternatively, when a button for instructing the electronic apparatus 10 to start operation is pressed, the electronic apparatus 10 returns from a standby state to an operation state. When the electronic apparatus 10 is switched on or when the electronic apparatus 10 starts operation as described above (YES in S101), also the data management device 1 starts a series of processes related to the data management functions. That is, first, the state detection unit 21 detects the state of the electronic apparatus 10 (S102). The state detection unit 21 keeps detecting the state of the electronic apparatus 10, standby for a change in the state, unless the electronic apparatus 10 is switched off (NO in S103, and NO in S109).

In the case where the state of the electronic apparatus 10 has changed after the state detection unit 21 started detecting the state (YES in S103), the detected state after the change is judged. Specifically, in the case where the state detection unit 21 has detected that the electronic apparatus 10 is in the normal operating state (A in S104), the data selection unit 22 selects the instruction manual data according to the selection rules listed in FIG. 5 (S105). The data management unit 23 reads the instruction manual data from the data storage unit 32 according to the selection made by the data selection unit 22 and writes the data in the IC tag 2 (S106).

On the other hand, in the case where the state detection unit 21 detects that the electronic apparatus 10 is in the error state (B in S104), the data selection unit 22 selects the error recovery guide data according to the selection rules (S107). The data management unit 23 reads the error recovery guide data from the data storage unit 32 according to the selection made by the data selection unit 22 and writes the data in the IC tag 2 (S108).

After S106 or S108, the state detection unit 21 returns to S102 and keeps detecting the state of the electronic apparatus 102, standby for a next change in the state, unless the electronic apparatus 10 is switched off (NO in S109).

On the other hand, in the case where a Power Off switch is pressed and the electronic apparatus 10 is switched off or when the operation is finished and the electronic apparatus 10 is automatically switched off (YES in S109), the series of processes of the data management device 1 end.

With the above described configuration and method, when the state detection unit 21 detects that the state has changed from the normal operating state to the error state or has changed to other way around, the data selection unit 22 selects data to be stored in the IC tag 2 according to the state after the change. Specifically, in the case where the electronic apparatus 10 is in the normal operating state, the data selection unit 22 selects the instruction manual data, whereas in the case where the electronic apparatus 10 is in the error state, the data selection unit 22 selects the error recovery guide data. Then, the data management unit 23 stores the data specified by the data selection unit 22 in the IC tag 2.

As a result, the memory of the IC tag 2 always stores data of contents conforming with the state of the electronic apparatus 10 detected at that time. The data of contents conforming with the state of the electronic apparatus 10 includes information needed by the user according to the state of the electronic apparatus 10.

Therefore, the data management device 1 can manage data to immediately present necessary information to the user according to the state of the electronic apparatus 10. As a result, the data management device 1 has an effect of enabling user convenience to be improved in the uses of the electronic apparatus 10.

[Processing Flow of Error Recovery Support System]

Figure 7:
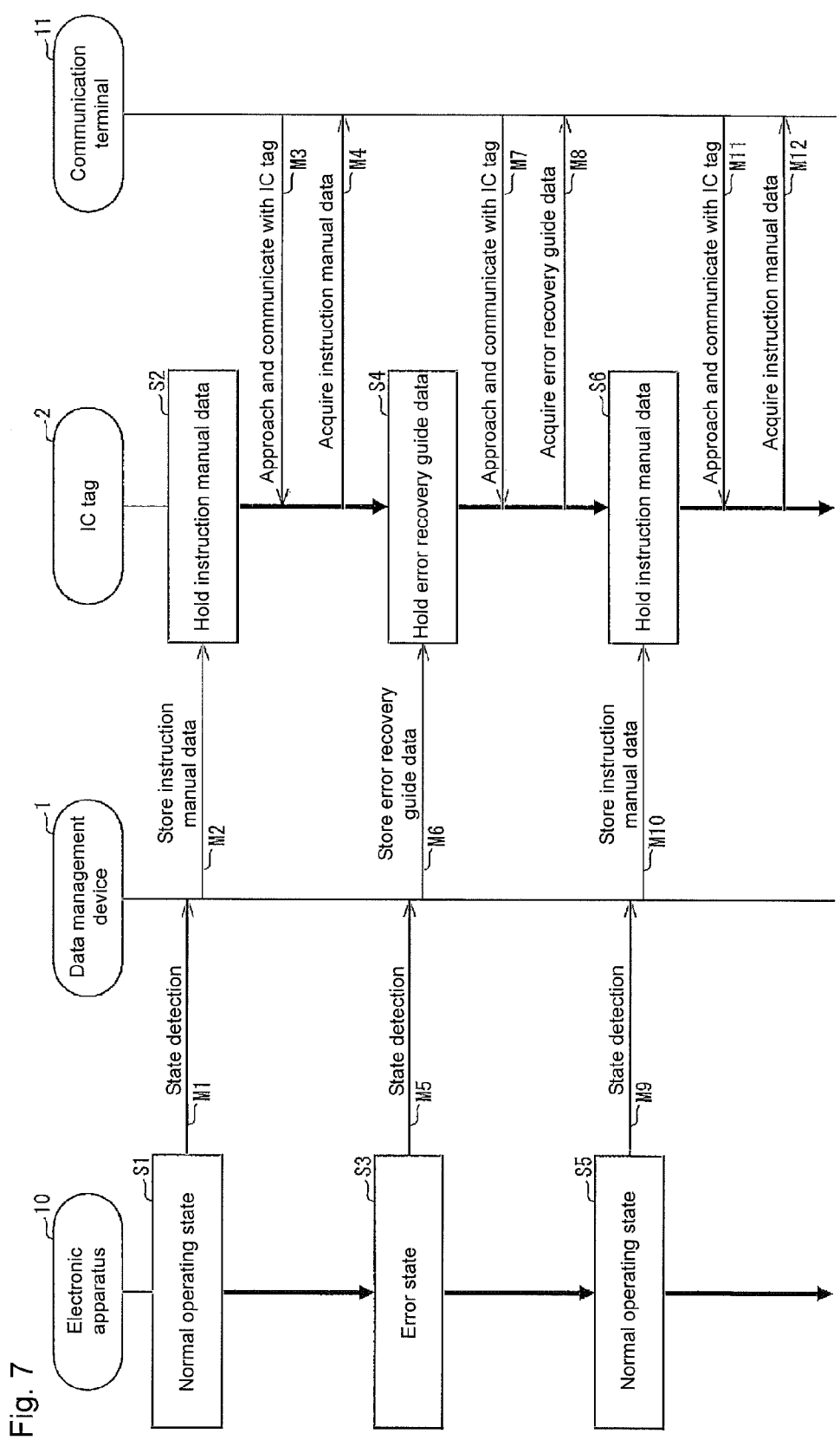
FIG. 7 is a sequence diagram showing a processing flow in the error recovery support system.

Now, states of the respective entities and an operation flow of the error recovery support system 100 will be described with reference to FIG. 7. FIG. 7 is a sequence diagram showing a processing flow in the error recovery support system 100.

When the electronic apparatus 10 is changed from a power OFF state or the error state to the normal operating state (S1), the data management device 1 detects the normal operating state (M1) and stores the corresponding instruction manual data in the IC tag 2 (M2). From that time point onward, the IC tag 2 holds the instruction manual data (S2).

On the condition that the RF reader/writer unit 3 of the communication terminal 11 and the IC tag 2 of the electronic apparatus 10 communicate with each other as a result of user's holding the communication terminal 11 over the electronic apparatus 10 after S2 and before S3 in which the state of the electronic apparatus 10 changes (M3), the communication terminal 11 can read the instruction manual data from the IC tag 2 (M4).

When the electronic apparatus 10 is changed from the normal operating state to the error state (S3), the data management device 1 detects the error state (M5) and stores the corresponding error recovery guide data in the IC tag 2 (M6). From that time point onward, the IC tag 2 holds the error recovery guide data (S4). In one or more embodiments of the present invention, the IC tag 2 is configured to hold only one data unit owing to restrictions on the memory capacity. Therefore, in the above described case, the instruction manual data is overwritten by the error recovery guide data or is deleted and then the error recovery guide data is held anew.

On the condition that the communication terminal 11 and the IC tag 2 communicate with each other after S4 and before S5 in which the state of the electronic apparatus 10 changes again (M7), the communication terminal 11 can read the error recovery guide data from the IC tag 2 (M8).

When the electronic apparatus 10 returns to the normal operating state (S5), the data management device 1 detects the normal operating state and stores the instruction manual data in the IC tag 2 (M9 and M10) as in M1 and M2. As a result, the IC tag 2 holds the instruction manual data again (S6). After S6, the communication terminal 11 can read the instruction manual data from the IC tag 2 (M11 and M12).

As described above, with the data management device 1 according to one or more embodiments of the present invention, when the electronic apparatus 10 is in the normal operating state, the communication terminal 11 can read the instruction manual data, and when the electronic apparatus 10 is in the error state, the communication terminal 11 can read the error recovery guide data to be needed for error recovery.

Therefore, the data management device 1 can manage data to immediately present necessary information to the user according to the state of the electronic apparatus 10. As a result, the data management device 1 has an effect of enabling user convenience to be improved in the uses of the electronic apparatus 10.

A data management device 1 according to one or more embodiments of the present invention will be described below with reference to FIGS. 8 to 10. For convenience of description, members similar to those of the members described will be denoted by the same reference symbols and description of them will be omitted.

One or more embodiments of the present invention is configured to select whether or not to store the error recovery guide data in the IC tag 2 according to whether the electronic apparatus 10 is in the error state.

However, the more multiple functions the electronic apparatus 10 has and the more complex structure the electronic apparatus 10 is provided with, the more varied the causes of troubles and failures might be, and there would be a huge amount of the error recovery guide data.

With the configuration of enabling the communication terminal 11 to acquire the error recovery guide data merely in response to the error state, the user will have to search information needed to solve the present error of the electronic apparatus 10 from the huge amount of error recovery guide data.

Moreover, owing to restrictions on the capacity of the memory of the IC tag 2 to store data, the IC tag 2 is incapable of storing the error recovery guide data that includes information corresponding to all errors. Especially in case where the error recovery guide data includes data requiring a large storage capacity such as an image and a moving image, solving the problem is not easy.

A configuration and operation of the further convenient data management device 1 according to one or more embodiments of the present invention that can solve the above described problem will be described.

[Configuration of Data Management Device]

The configuration of the data management device 1 according to one or more embodiments of the present invention differs from that shown in FIG. 1 as below.

In one or more embodiments of the present invention, the state detection unit 21 monitors the respective units of the electronic apparatus 10 (particularly, the apparatus function execution units 9) and, in the case where an error occurs, the state detection unit 21 more specifically detects what kind of error has occurred.

As an example, the state detection unit 21 can detect states described below as the error state of the electronic apparatus 10 (clothes washing machine).

The state "does not operate" refers to a state in which the apparatus function execution units 9 of the electronic apparatus 10 do not operate, therefore, a series of fully automatic clothes washing functions has stopped.

The state "cannot spin" refers to a state in which the washing machine tub does not function after washing, rinsing, and draining processes, therefore, the washing machine has stopped before a spinning process.

The state "water is not supplied" refers to a state in which a water supply unit does not function, therefore, a washing process has not started.

The state "needs repair" refers to a state in which any of the apparatus function execution units 9 and the respective parts has a trouble or has worn out and needs to be replaced, therefore, a series of clothes washing functions has stopped.

In one or more embodiments of the present invention, the selection rule storage unit 31 stores selection rules listed in FIG. 8 as an example. FIG. 8 is a table listing another specific example of selection rules stored in the selection rule storage unit 31.

As shown in FIG. 8, the table of the selection rules according to one or more embodiments of the present invention associates each state of the errors detected by the state detection unit 21 with a type of the error recovery guide data corresponding to that state of the error. For example, the state "does not operate" is associated with the type of data "error recovery guide data A". The state "cannot spin-dry" is associated with the types of data "error recovery guide data B-1" and "error recovery guide data B-2". As such, a plurality of types of the error recovery guide data can be associated with a state. Further, the same error recovery guide data can be associated with a plurality of different states.

The data selection unit 22 selects data to be stored in the IC tag 2 according to the state detected by the state detection unit 21 by referring to the selection rules. In the case where the normal operating state is detected, the state detection unit 21 selects the instruction manual data, whereas where the error state is detected, the state detection unit 21 further selects the error recovery guide data corresponding to the type of the error.

In one or more embodiments of the present invention, the data storage unit 32 stores the instruction manual data and a plurality of types of error recovery guide data units corresponding to the respective errors. FIG. 9 is a table listing specific examples of data stored in the data storage unit 32 according to one or more embodiments of the present invention.

As illustrated in FIG. 9, the data storage unit 32 stores the instruction manual data and a plurality of types of error recovery guide data units prepared for the types of error to be detected. The data formats for the respective types of data are, for example, the PDF data for the instruction manual data and the text data for the error recovery guide data without limitation to the examples listed in FIG. 9. Alternatively, the instruction manual data and the error recovery guide data may be any of moving image data, image data, and audio data, or may include data in a plurality of types of formats.

For example, in the case where the data selection unit 22 selects "error recovery guide data C", the data management unit 23 reads text data 50 and moving image data 51 from the data storage unit 32 and stores them in the IC tag 2.

[Processing Flow of Data Management Device]

Now, a processing flow of the data management device 1 according to one or more embodiments of the present invention will be described with reference to FIG. 6 and FIG. 10.

The processing flow of the data management device 1 according to one or more embodiments of the present invention is the same as that of the data management device 1 illustrated in FIG. 6 except step S106. Therefore, a flow of an "error recovery guide data selection process" performed by the data selection unit 22 of the data management device 1 in place of the process in S106 will be described below with reference to FIG. 10.

Figure 10:
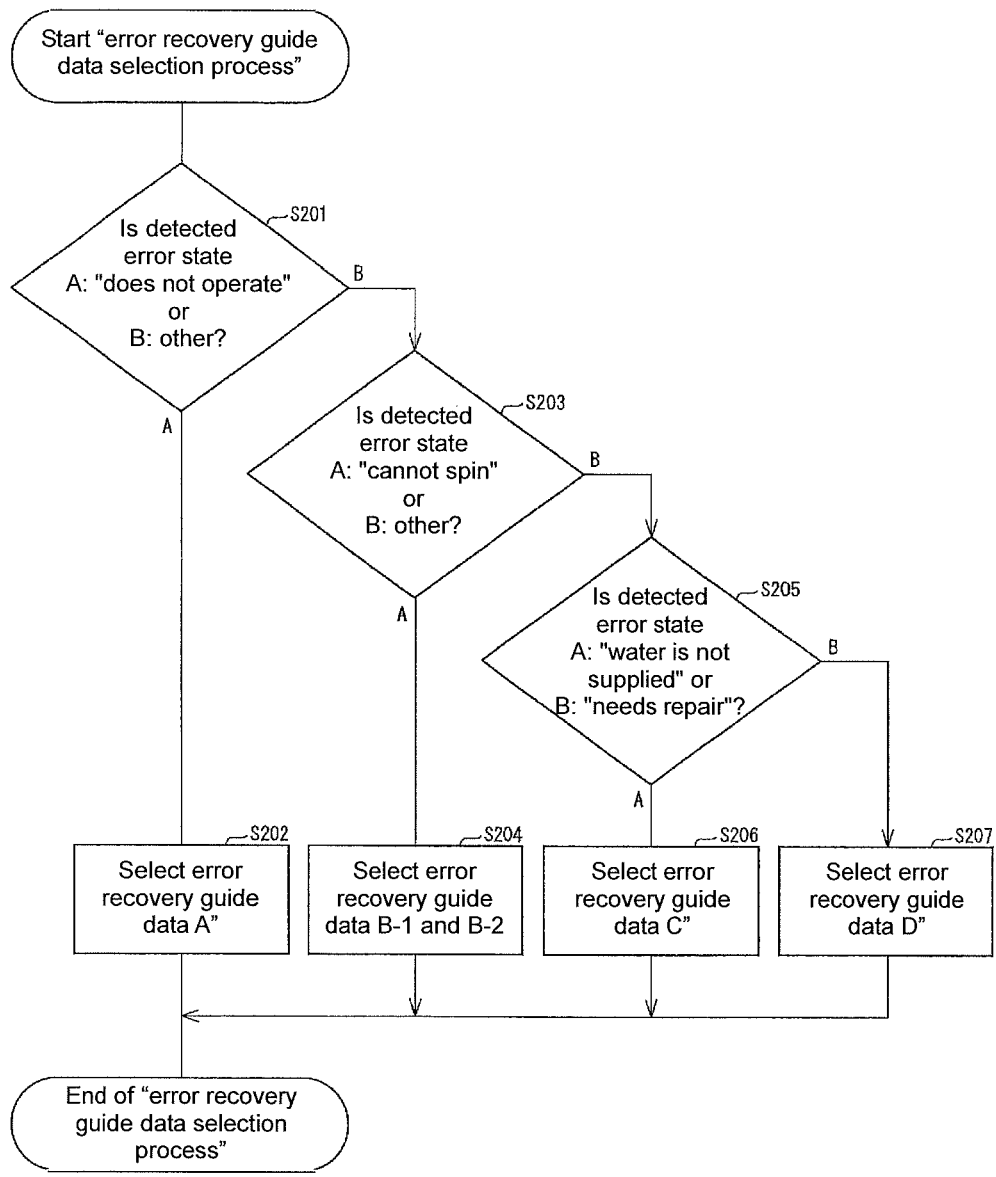
FIG. 10 is a flow chart showing a flow of an "error recovery guide data selection process" performed by a data selection unit of the data management device.

FIG. 10 is a flow chart showing a flow of the "error recovery guide data selection process" performed by the data selection unit 22.

In the case where the state detection unit 21 detects the error state "does not operate" (A in S201), the data selection unit 22 selects the error recovery guide data A according to the selection rules listed in FIG. 8 (S202). In the case where the state detection unit 21 detects the error state "cannot spin-dry" (B in S201 and A in S203), the data selection unit 22 selects the error recovery guide data B-1 and B-2 (S204). In the case where the state detection unit 21 detects the error state "water is not supplied" (B in S203 and A in S205), the data selection unit 22 selects the error recovery guide data C (S206). In the case where the state detection unit 21 detects the error state "needs repair" (B in S205), the data selection unit 22 selects the error recovery guide data D (S207).

When the data selection unit 22 has finished the error recovery guide data selection process shown in FIG. 10, the data management unit 23 reads the error recovery guide data selected by the data selection unit 22 from the data storage unit 32 (FIG. 9) and writes the data in the IC tag 2 (S107 in FIG. 6).

As described above, with the above described configuration and method, when the electronic apparatus 10 is in the normal operating state, the communication terminal 11 can read the instruction manual data, and when the electronic apparatus 10 is in the error state, the communication terminal 11 can read the error recovery guide data conforming with the type of error encountered by the electronic apparatus 10. The error recovery guide data conforming with the type of error encountered by the electronic apparatus 10 is the error recovery guide data including information needed to recover from the error (for example, instructions on a procedure to solve the error).

As a result, the user is released from a troublesome task of searching out necessary information from a huge amount of error recovery guide data mixed with the information currently unnecessary. Further, since the data management device 1 according to one or more embodiments of the present invention is adapted to store only the necessary information in the IC tag 2 for a period of time when the information is needed, the problem of the memory capacity of the IC tag 2 will be solved.

As described above, the data management device 1 can manage data to immediately present necessary information to the user according to the state of the electronic apparatus 10. As a result, the data management device 1 has an effect of solving the problem of the memory capacity and also enabling user convenience to be further improved in the uses of the electronic apparatus 10.

A data management device 1 according to one or more embodiments of the present invention will be described below with reference to FIGS. 11 to 16. For convenience of description, members similar to those of the members described above will be denoted by the same reference symbols and description of them will be omitted.

One or more of the above described embodiments are configured to respond to a case where an error occurs in the electronic apparatus 10 by reading data corresponding to the occurring error from the data storage unit 32 and storing the data in the IC tag 2.

However, on the condition that an error occurring in the electronic apparatus 10 is a failure so serious that the power supply is cut off, the power supply to the electronic apparatus 10 has already been cut off and, accordingly, the data management device 1 installed in the electronic apparatus 10 is unable to operate when the error occurs. As a result, it is too late for the data management device 1 to store the error recovery guide data conforming with the occurring serious error in the IC tag 2, therefore, the IC tag 2 still keeps data of the contents conforming with the preceding state before the state of the occurrence of the serious error. Therefore, according to the configurations of one or more of the above described embodiments, the convenience of reading the data from the IC tag 2 is guaranteed even though an error is so serious that the power supply of the electronic apparatus 10 is cut off. However, since the data has the contents conforming with the preceding state before the state of the occurrence of the serious error, the data lacks accuracy in view of whether the information is the one that is needed to solve the serious error.

Then, in one or more embodiments of the present invention, the configuration and operation of the further convenient data management device 1 that can solve the above described problem will be described.

[Configuration of Data Management Device]

Figure 11:
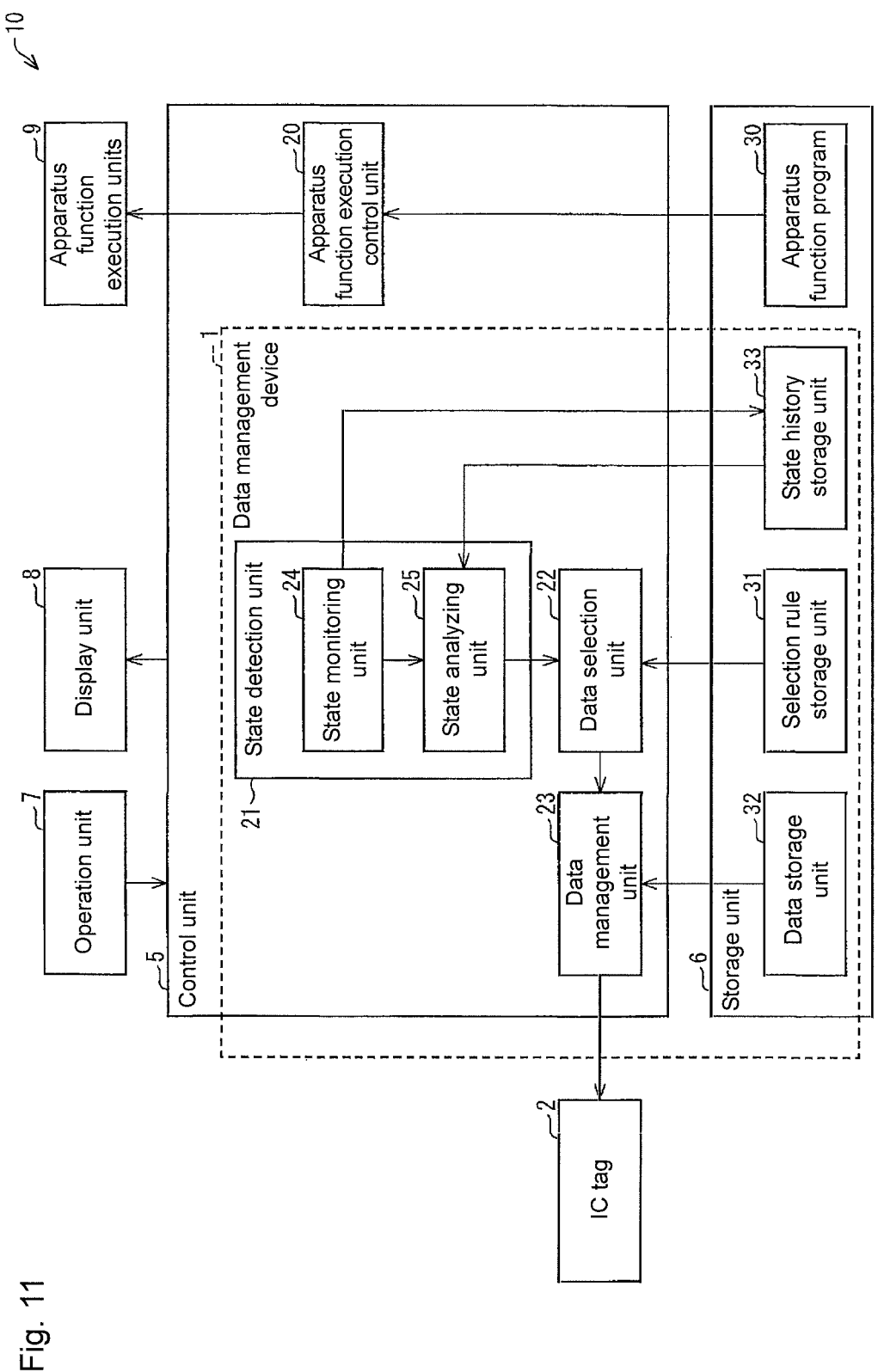
FIG. 11 is a functional block diagram illustrating a configuration of a main part of a data management device according to one or more embodiments of the present invention.

FIG. 11 is a functional block diagram illustrating a configuration of a main part of the data management device 1 according to one or more embodiments of the present invention.

The configuration of the data management device 1 illustrated in FIG. 11 differs from the configuration of the data management device 1 illustrated in FIG. 1 in that the state detection unit 21 as a functional block of the control unit 5 further includes a state monitoring unit 24 and a state analyzing unit 25. Further difference is that the storage unit 6 further includes a state history storage unit 33.

The state monitoring unit 24 monitors the state of the electronic apparatus 10 and records a history of changes in the state collected from the monitoring in the state history storage unit 33. The state monitoring unit 24 stores information including when the electronic apparatus 10 changed to what kind of state and how long the electronic apparatus 10 has been in what kind of state in the state history storage unit 33. Hereafter, the information indicating when the electronic apparatus 10 changed to what kind of state will be referred to as "state history"; information indicating a total number of hours the electronic apparatus 10 has been in the normal operating state will be referred to as "total operation hours"; and information indicating a total number of days the electronic apparatus 10 has been used will be referred to as "total operation days".

In one or more embodiments of the present invention, the state monitoring unit 24 monitors the electronic apparatus 10 and stores the state history, the total operation hours, and the total operation days in the state history storage unit 33.

The state analyzing unit 25 analyzes information collected by the state monitoring unit 24 (for example, the state history, the total operation hours, and the total operation days stored in the state history storage unit 33) at a specified point of time and detects the state of the electronic apparatus 10 at that point of time.

In one or more embodiments of the present invention, the state analyzing unit 25 regularly repeats the analysis and detection of the state at certain time intervals according to an elapsed time measured by a clocking unit (not shown).

The state detection unit 21 regularly detects the state of the electronic apparatus 10 by the series of processes of the state monitoring unit 24 and the state analyzing unit 25.

The point of time for the state analyzing unit 25 to perform analysis and detection of the state is specified as required according to a style of use, performance, features of the electronic apparatus 10. For example, the point of time may be specified as "(analyze and detect) at the power on (first time) and at intervals of t minutes onward" or "(analyze and detect) once a day at a predetermined time". For example, in the case where the electronic apparatus is a digital television to be operated for a long time period, the state analyzing unit 25 may be configured to repeat analyzing and detecting the state at intervals of t minutes (seconds). Alternatively, in the case where the electronic apparatus is a clothes washing machine usually used every morning, the state analyzing unit 25 may be configured to repeat analyzing and detecting the state at intervals of t minutes in the morning and at intervals of several hours in the afternoon. Alternatively, the data management device 1 may be configured to allow the timing of analysis and detection to be set by the user operation at the user's option.

With the above described configuration, the data management device 1 can regularly monitor the state of the electronic apparatus 10 and regularly update the contents of the IC tag 2 according to the state of the electronic apparatus 10 at each point of time. Therefore, even after the electronic apparatus 10 has an error so serious that the power supply is cut off, the communication terminal 11 can read data of contents conforming with the state of the electronic apparatus 10 detected at oldest at t minutes (seconds) before the occurrence of the serious error, i.e., the preceding state, from the IC tag 2. Therefore, the data management device 1 can realize more accurate data management so that data stored in the IC tag 2 includes necessary information corresponding to the preceding state which is the closest to the final state of the electronic apparatus.

The state analyzing unit 25 analyzes the state of the electronic apparatus 10 by referring to the information stored in the state history storage unit 33, for example, as below. The state analyzing unit 25 analyzes whether the total operation hours has exceeded a predetermined threshold, whether the total operation days has exceeded a predetermined threshold, how many days has passed after the parts were replaced with new ones, the total number of occurrences of specific error, the frequency of a specific error, whether a specific error has occurred at least once, and whether the state history agrees with an occurrence scenario of a specific error. These items are examples of result of analysis which can be derived from the analysis by the state analyzing unit 25 and are not intended to limit operation of the state analyzing unit 25.

Meanwhile, the occurrence scenarios of specific errors refer to information defining the sequences of occurrences of a plurality of specific types of errors. The state analyzing unit 25 analyzes whether any of the state transitions agrees with any of the occurrence scenarios by comparing predetermined occurrence scenarios with the state history.

For example, it is assumed to be known from experience that specific errors "type P", "type Q", and "type R" statistically, frequently occur in this order as a symptom of an occurrence of an error so serious that the power supply is cut off. Then, an occurrence scenario of "errors "type P"→"type Q"→"type R" occur in the order" is defined in advance.

In the case where the state history stored in the state history storage unit 33 indicates that the errors "type P", "type Q", and "type R" has occurred in the order, the state analyzing unit 25 analyzes that the state history agrees with the above described occurrence scenario. Based on the result of analysis, the state detection unit 21 can detect that the electronic apparatus 10 is "in the state in which it is highly likely to encounter an error so serious that the power supply is cut off".

On the condition that occurrence of an error so serious that the power supply is cut off can be predicted like that, the data management device 1 is able to store data related to the serious error in the IC tag 2 before the power supply is actually cut off. As a result, even after the power supply is actually cut off, the communication terminal 11 can read the data related to the serious error from the IC tag 2. Therefore, the data management device 1 can realize more accurate data management so that data stored in the IC tag 2 includes necessary information corresponding to the state of the electronic apparatus.

[About State History Storage Unit 33]

FIG. 12 is a table listing a specific example of results monitored by the state monitoring unit 24 and stored in the state history storage unit 33. Meanwhile, the monitoring results are shown in a data structure of table only by way of example and it is not intended to limit the data structure of the monitoring results.

In a first table 52, the total operation hours and the total operation days of the electronic apparatus 10 are stored. The state monitoring unit 24 monitors the duration hours of the normal operating state and updates the total operation hours in the first table 52 by adding the duration hours. Once a day, the state monitoring unit 24 updates the total operation days in the first table 52 with the number of days the electronic apparatus 10 has been used.

In a second table 53, the state history is stored. The state monitoring unit 24 monitors the state of the electronic apparatus 10 and, when a specific event has occurred in the electronic apparatus 10 (or when the electronic apparatus 10 has changed from a certain state to another certain state, or the like), stores the date and the time of day when the event occurred and details of the event in the second table 53.

[About Selection Rules]

FIG. 13 is a table listing a specific example of selection rules stored in the selection rule storage unit 31 according to one or more embodiments of the present invention.

As shown in FIG. 13, the table of the selection rules according to one or more embodiments of the present invention associates each state detected by the state detection unit 21 (the state analyzing unit 25) with a type of data corresponding to the state.

The selection rules in FIG. 13 differs from those listed in FIG. 5 and FIG. 8 in that the "detected state" includes not only "a transient event" of an occurrence of a certain state but also "a state reflecting a long-term tendency" found by analysis of a plurality of events detected in a long period of time. For example, in a record 54 in the table of the selection rules, an occurrence scenario of "errors "type P"→"type Q"→"type R" occur in the order" is defined as the "state reflecting a long-term tendency".

As other specific examples, the state analyzing unit 25 analyzes the first table 52 shown in FIG. 12 and, on the condition that the total operation hours has reached 70 hours or more or that the total operation days has reached 90 days or more, detects that the state agrees with the state that "the total operation hours has reached 70 hours or more or the total operation days has reached 90 days or more". In that case, the data selection unit 22 selects error recovery guide data E associated with the detected state as data to be stored in the IC tag 2.

Alternatively, the state analyzing unit 25 analyzes the state history and, on the condition that two weeks or more has passed after the final occurrence of an event of filter replacement, detects that the electronic apparatus 10 is in the state that "two weeks or more has passed after the last filter replacement". In that case, the data selection unit 22 selects error recovery guide data F associated with the detected state as data to be stored in the IC tag 2.

Meanwhile, the state analyzing unit 25 may judge that the electronic apparatus 10 is in two or more of the states defined in the selection rules. In that case, the data selection unit 22 may select a plurality of data units associated with the respective detected states.

For example, in the case where the electronic apparatus 10 has encountered "an type X" error for five times and "an type P" error once, the state analyzing unit 25 detects that the state of the electronic apparatus 10 agrees with a first state that "error 'type X' has occurred for five times or more or occurs twice or more a week" and a second state that "error 'type P' has occurred". In that case, the data selection unit 22 selects error recovery guide data G and error recovery guide data H-1 as data to be stored in the IC tag 2.

[Processing Flow of Data Management Device]

Figure 14:
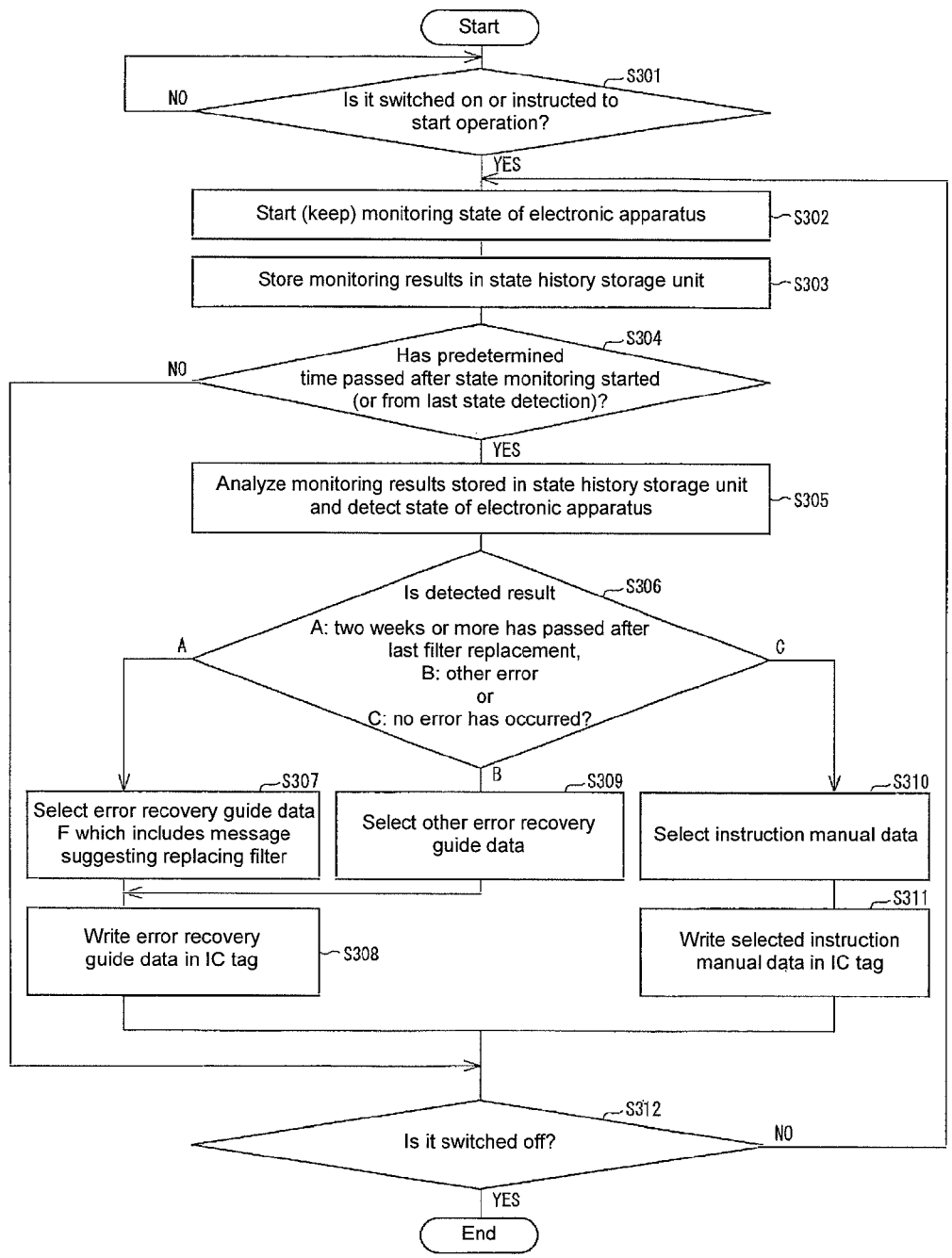
FIG. 14 is a flow chart showing a processing flow of the data management device.

FIG. 14 is a flow chart showing a processing flow of the data management device 1 according to one or more embodiments of the present invention. Here, it is assumed that the points of time for the state analyzing unit 25 to analyze and detect are specified as "(analyze and detect) t minutes after the power on or the start of operation (first time) and at intervals of t minutes onward".

When the electronic apparatus 10 is switched on or when the electronic apparatus 10 starts operation (YES in S301), the state monitoring unit 24 of the state detection unit 21 first starts monitoring the state of the electronic apparatus 10 (S302). When the state monitoring unit 24 detects an occurrence of an event, it stores the monitoring results (for example, the date, the time of day, details of the occurring event, etc.,) in the state history storage unit 33 (S303). The state monitoring unit 24 may further store the total operation hours and the total operation days. The state monitoring unit 24 keeps monitoring the state of the electronic apparatus 10, unless the electronic apparatus 10 is switched off (NO in S304, and NO in S312).

When a predetermined time (here, t minutes) has passed after the state monitoring unit 24 started monitoring the state of the electronic apparatus 10 (YES in S304), the state analyzing unit 25 of the state detection unit 21 analyzes the monitoring results stored in the state history storage unit 33 and detects the state (long-term tendency) of the electronic apparatus 10 at that point of time (S305).

For example, in the case where the state analyzing unit 25 detects that the electronic apparatus 10 is in the state that "two weeks or more has passed after the last filter replacement" (A in S306), the data selection unit 22 selects the error recovery guide data F according to the selection rules listed in FIG. 13 (S307). The error recovery guide data F includes, for example, a message prompting the user to change the filter, thus, has contents conforming with the above described state.

On the other hand, in the case where the state analyzing unit 25 detects that the electronic apparatus 10 is in the state involved in an error other than the above described error (B in S306), the data selection unit 22 selects the error recovery guide data associated with the detected error state according to the selection rules (S309).

Then, the data management unit 23 reads the error recovery guide data selected in S307 or S309 from the data storage unit 32 and writes the data in the IC tag 2 (S308). After that, the state monitoring unit 24 of the state detection unit 21 returns to S302 and keeps monitoring the state of the electronic apparatus 10, unless the electronic apparatus 10 is switched off (NO in S312).

On the other hand, in the case where the electronic apparatus 10 has not encountered any error and keeps the normal operating state without any problem, the state analyzing unit 25 detects that the electronic apparatus 10 is in a state "no error has occurred". In that case (C in S306), the data selection unit 22 selects the instruction manual data associated with the state "no error has occurred" according to the selection rules (S310).

Then, the data management unit 23 reads the instruction manual data from the data storage unit 32 and writes the data in the IC tag 2 (S311). After that, the state monitoring unit 24 of the state detection unit 21 returns to S302 and keeps monitoring the state of the electronic apparatus 10, unless the electronic apparatus 10 is switched off (NO in S312).

In the case where a Power Off switch is pressed and the electronic apparatus 10 is switched off, or when the operation has finished and the electronic apparatus 10 is automatically switched off, or in the case where the power supply is cut off as a result of a serious error (YES in S312), the series of processes of the data management device 1 end. On the other hand, as described above, as far as the electronic apparatus 10 is in the switched on (NO in S312), the state detection unit 21 repeats the state detection. That is, in the case where the state monitoring unit 24 keeps monitoring the electronic apparatus 10 (S302) and t minutes has passed from the last state detection (the above described S305) (YES in S304), the state analyzing unit 25 analyzes and detects the state of the electronic apparatus 10 again (S305).

[Processing Flow of Error Recovery Support System]

Figure 15:
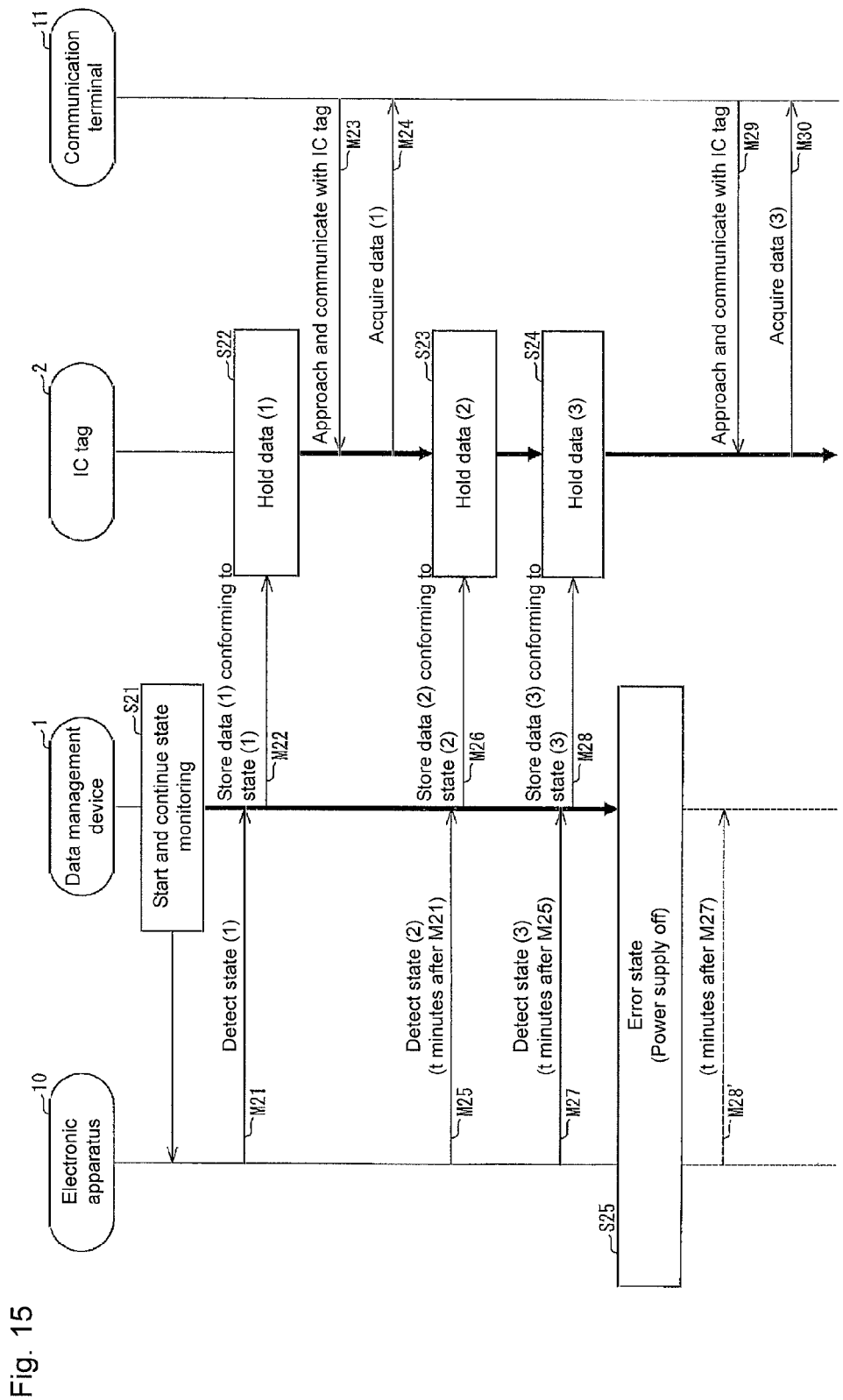
FIG. 15 is a sequence diagram showing a processing flow in an error recovery support system.

Now, states of the respective entities and an operation flow of the error recovery support system 100 will be described with reference to FIG. 15. FIG. 15 is a sequence diagram showing a processing flow in the error recovery support system 100.

When the electronic apparatus 10 is switched on, the state monitoring unit 24 of the data management device 1 starts monitoring and keeps monitoring the state of the electronic apparatus 10 (S21). At a time point M21 which is t minutes after S21, the state analyzing unit 25 of the data management device 1 analyzes the state of the electronic apparatus 10 and detects the state of the electronic apparatus 10 (here, a state (1)) (M21). The data management device 1 selects data (1) conforming with the state (1) and stores the data in the IC tag 2 (M22). From that time point onward, the IC tag 2 holds the data (1) (S22).

On the condition that the user holds the communication terminal 11 over the electronic apparatus 10 after S22 and before t minutes has passed from the last state detection time point M21 (time point M25), the RF reader/writer unit 3 of the communication terminal 11 and the IC tag 2 of the electronic apparatus 10 communicate with each other (M23), then, the communication terminal 11 can read the data (1) from the IC tag 2 (M24).

In the case where a state (2) is detected in the data management device 1 at t minutes after M21 (M25), data (2) conforming with the state (2) is stored in the IC tag 2 (M26). The state of S23 is kept until the contents of the IC tag 2 is updated at t minutes after M25. At t minutes after M25, a state (3) is detected (M27) and the data (3) is stored (M28), so that the IC tag 2 holds the data (3) (S24).

It is assumed that a serious error has occurred and the power supply to the electronic apparatus 10 has been cut off before t minutes has passed from M27 (M28') (S25). At S25, although the electronic apparatus 10 (the data management device 1) does not operate, the communication terminal 11 can communicate with the IC tag 2 of the electronic apparatus 10. The IC tag 2 is still holding the data (3) held in S24. Therefore, the RF reader/writer unit 3 of the communication terminal 11 can communicate with the IC tag 2 (M29) and read the data (3) from the IC tag 2 (M30).

With the above described configuration, the data management device 1 can monitor the state of the electronic apparatus 10 and regularly (here, at intervals of t minutes) update the contents of the IC tag 2 according to the state of the electronic apparatus 10 at each point of time. Therefore, even after the electronic apparatus 10 has an error so serious that the power supply is cut off (after S25 onward), the communication terminal 11 can read data of contents conforming with the state of the electronic apparatus 10 detected at oldest at t minutes or less before the occurrence of the serious error, i.e., the state detected at the preceding time point M27, from the IC tag 2. Therefore, the data management device 1 can realize more accurate data management so that data stored in the IC tag 2 includes necessary information corresponding to the preceding state which is the closest to the final state of the electronic apparatus.

[Statistical Analysis of State Analyzing Unit 25]

As described above, the state analyzing unit 25 detects a "long-term state" of the electronic apparatus 10 by analyzing a plurality of events detected in a long period of time. Further, the state analyzing unit 25 may detect the state of the electronic apparatus 10 by statistically analyzing an occurrence frequency or the number of occurrences of a plurality of events detected in a long period of time.

For example, the state analyzing unit 25 counts the number of errors occurred in the past for each type of errors by referring to the state history (the second table 53 of FIG. 12) stored in the state history storage unit 33. Then, the state analyzing unit 25 identifies the type of error with the highest number of occurrences.

Then, the data selection unit 22 selects data corresponding to the most frequent error identified as such by the state analyzing unit 25 as the highest priority error recovery guide data.

The selection rules listed in FIG. 16, for example, are assumed to be the selection rules referred by the data selection unit 22 in the above described configuration. FIG. 16 is a table listing another specific example of selection rules stored in the selection rule storage unit 31 according to one or more embodiments of the present invention.

As shown in FIG. 16, the table of the selection rules according to one or more embodiments of the present invention associates each state detected by the state analyzing unit 25 based on the statistical analysis with a type of data corresponding to the state.

Specifically, in the case where the state analyzing unit 25 determines from the analysis that the error state "does not operate" is the most frequent error, the data selection unit 22 selects the error recovery guide data A associated with a state that the error with the highest number of occurrences is "does not operate" as the highest priority error recovery guide data to be stored in the IC tag 2.

With the above described configuration, the data management device 1 can monitor the state of the electronic apparatus 10 to obtain a long-term tendency of errors occurred in the electronic apparatus 10 and keep the IC tag 2 such that data including contents conforming with that tendency of errors is stored.

The communication terminal 11 can always read data of contents conforming with the tendency of errors occurred in the electronic apparatus 10 from the IC tag 2. Therefore, the data management device 1 can realize more accurate data management so that data stored in the IC tag 2 includes necessary information corresponding to the state of the electronic apparatus.

An error recovery support system 100 according to one or more embodiments of the present invention will be described below with reference to FIG. 4 and FIGS. 17 to 28. For convenience of description, members similar to those of the members described above will be denoted by the same reference symbols and description of them will be omitted.

The error recovery support system 100 for supporting a user in removing an error from the electronic apparatus 10 has been described above. In the error recovery support system 100 according to one or more embodiments of the present invention, the communication terminal 11 as a user support device has achieved user support by reading data of contents conforming with the state of the electronic apparatus 10 at that time point from the IC tag 2 of the electronic apparatus 10 and presenting the data to the user.

In one or more embodiments of the present invention, a configuration of the error recovery support system 100, particularly a configuration of the communication terminal 11, will be described which is capable of further providing an error recovery support tool for the user in preparation for a case where only provision of data read out from the IC tag 2 to the user is not enough for the user to remove the error.

[Functional Composition of Communication Terminal]

As illustrated in FIG. 4, the control unit 15 of the communication terminal 11 has a display control unit 40, an input receiving unit 41, a data transmission control unit 42, and a data acquisition control unit 43 as functional blocks.

The display control unit 40 controls video contents to be displayed on the display unit 17*b*. Particularly, in one or more embodiments of the present invention, the display control unit 40 converts data acquired by the RF reader/writer unit 3 from the IC tag 2 of the electronic apparatus 10 into video signals for displaying the acquired data on the display unit 17*b* and outputs the video signals to the display unit 17*b*. Further, when an error occurs in the electronic apparatus 10, the display control unit 40 generates a guide screen (a GUI screen) for guiding the user to a further error recovery support tool and outputs video signals of the guide screen to the display unit 17*b*.

The input receiving unit 41 receives a command signal input by the user via the input unit 17*a* and transmits the contents of the command to units of the communication terminal 11 requiring the command.

The data transmission control unit 42 transmits respective types of data about the communication terminal 11 (particularly, data such as the data read by the RF reader/writer unit 3 from the IC tag 2) stored in the storage unit 16 to an external apparatus by controlling the communication unit 18. For example, the data transmission control unit 42 is capable of transmitting the above described data to the management server 12 or the operator terminal 13 via the communication unit 18 over the wide area communication network 14.

The data acquisition control unit 43 reads and acquires the data (such data as the instruction manual data and the error recovery guide data) stored in the IC tag 2 of the electronic apparatus 10 by controlling the RF reader/writer unit 3. The data acquisition control unit 43 stores the data acquired via the RF reader/writer unit 3 in the storage unit 16. That enables the communication terminal 11 to perform information processing in itself on the data stored in the IC tag 2.

In one or more embodiments of the present invention, the communication terminal 11 is configured to provide an error recovery support tool for the user to remove an error.

Specifically, the communication terminal 11 is configured to display and present the error recovery guide data read from the IC tag 2 to the user as a first error recovery support tool. As a second error recovery support tool, the communication terminal 11 is configured to supply information about the error state of the electronic apparatus 10 read from the IC tag 2 to a call center (the operator terminal 13 or the management server 12) and communicate with the operator terminal 13 to enable the user to exchange useful information with an operator by simple operation. As a third error recovery support tool, the communication terminal 11 is configured to further enable the user to reserve an on-site repair visit of a service person (repair technician) by simple operation.

A method by which the communication terminal 11 provides the first to third error recovery support tools for the user will be described below with reference to a transition diagram of screens displayed on the display unit 17*b* and specific examples of the respective screens.

Figure 17:
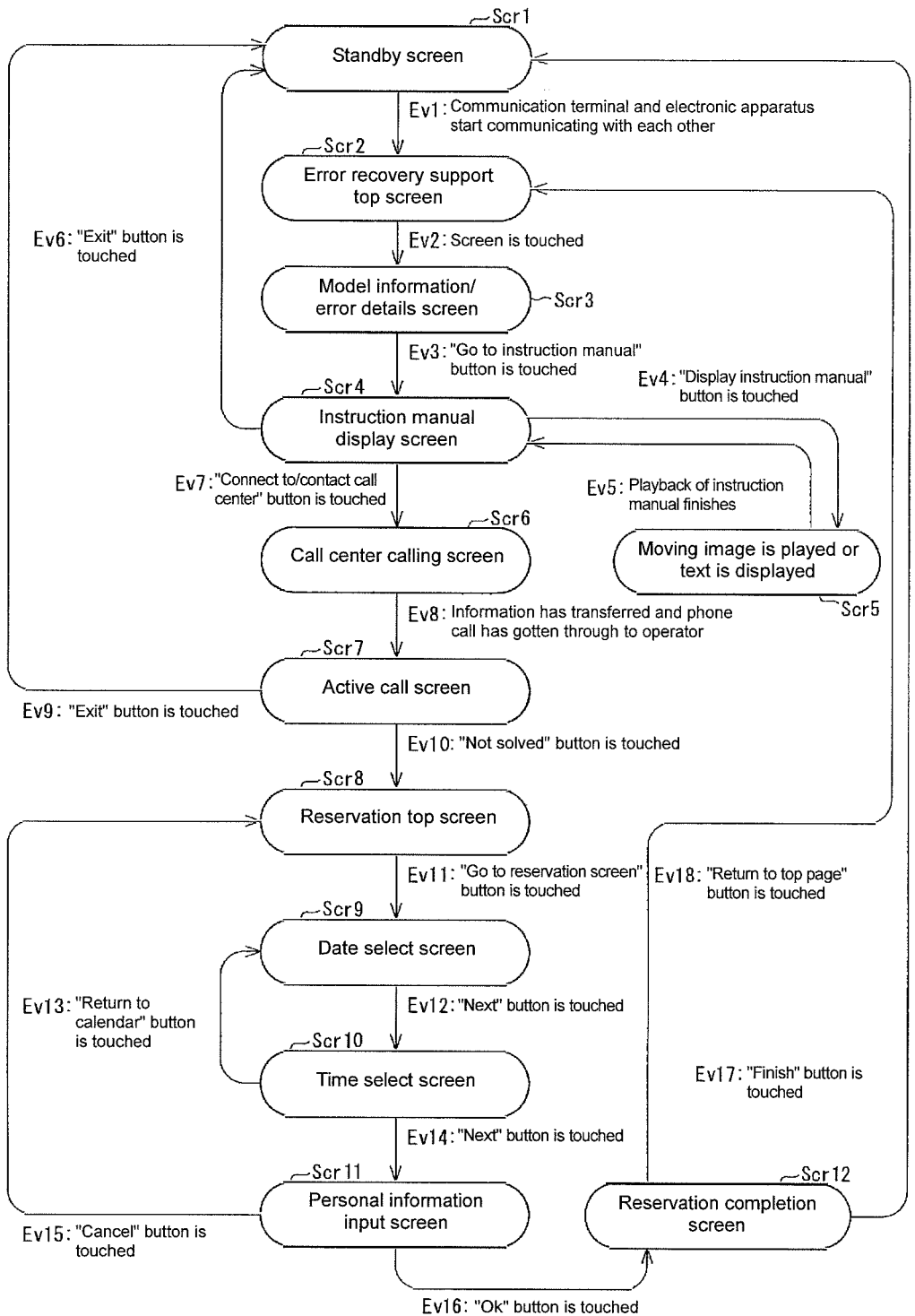
FIG. 17 is a screen transition diagram describing how a screen displayed on a display unit by a display control unit of the communication terminal is transitioned in response to occurrences of events.

FIG. 17 is a screen transition diagram describing how a screen displayed on the display unit 17*b* by the display control unit 40 is transitioned in response to occurrences of events. FIGS. 18 to 28 are diagrams illustrating specific examples of various screens displayed on the display unit 17*b* by the display control unit 40.

Referring to FIG. 17, the display control unit 40 of the communication terminal 11 realizes the first error recovery support tool by displaying screens Scr2 to Scr5 on the display unit 17*b*. The display control unit 40 realizes the second error recovery support tool by displaying screens Scr4 and Scr6 to Scr7 on the display unit 17*b*. The display control unit 40 realizes the third error recovery support tool by displaying screens Scr8 to Scr12 on the display unit 17*b*.

First, in the case where the communication terminal 11 is in a standby state in which the terminal is not performing a specific process, the display control unit 40 outputs a standby screen Scr1 to the display unit 17*b*. Since the standby screen Scr1 is similar to known standby screens of smart phones and cellular phones, it is not illustrated in the figures in particular.

Figure 18:
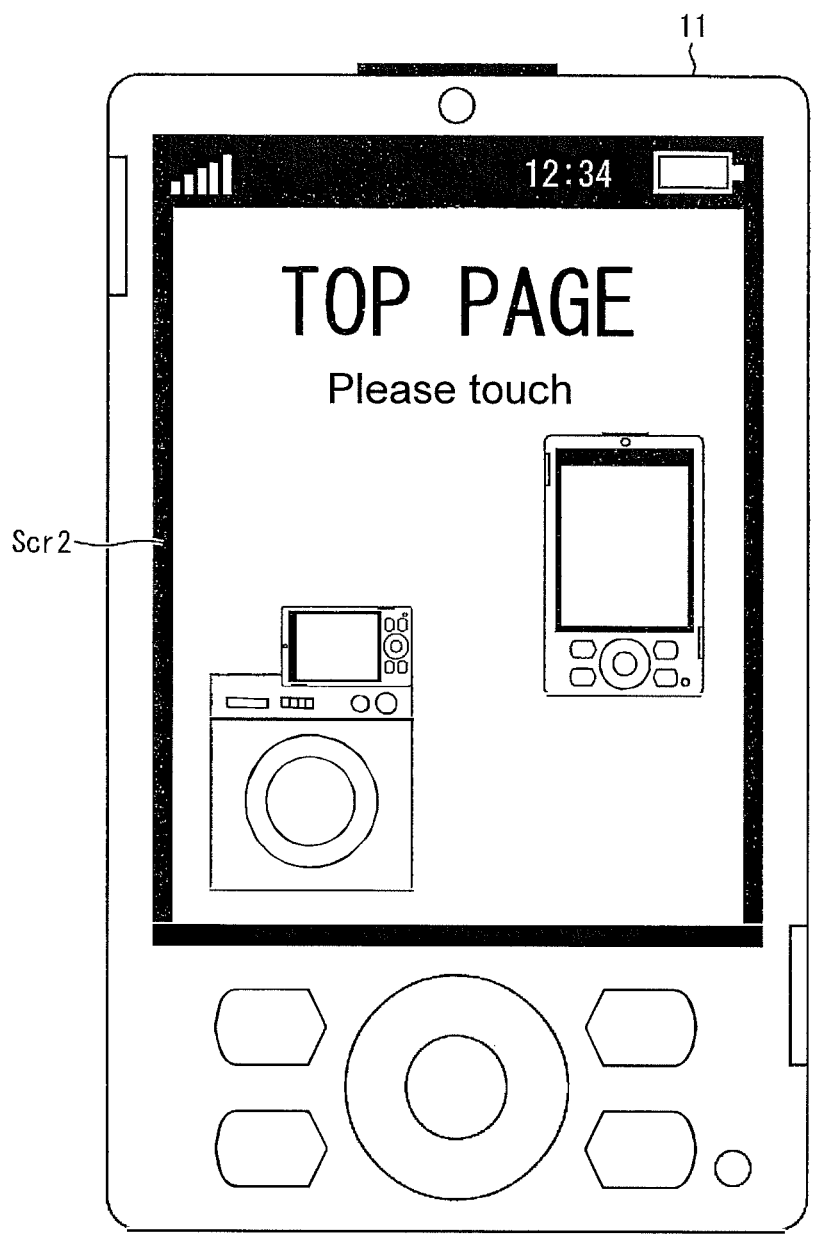
FIG. 18 is a diagram illustrating a specific example of top screen Scr2 displayed on the display unit by the display control unit.

Here, it is assumed that the electronic apparatus 10 has a trouble and the user holds the communication terminal 11 over the accessible surface 2*a* of the electronic apparatus 10 as illustrated in FIG. 3 to acquire the error recovery guide data. As a result, an event Ev1 occurs in which the RF reader/writer unit 3 of the communication terminal 11 and the IC tag 2 of the electronic apparatus 10 start communicating with each other. In response to the occurrence of the event Ev1, the display control unit 40 outputs a top screen Scr2 of an error recovery support application program for the electronic apparatus 10 to the display unit 17*b*. FIG. 18 illustrates a specific example of the top screen Scr2. As illustrated in FIG. 18, the display control unit 40 displays a message prompting the user to touch the screen of the touch panel 17 if he intends to use the application program.

Figure 19:
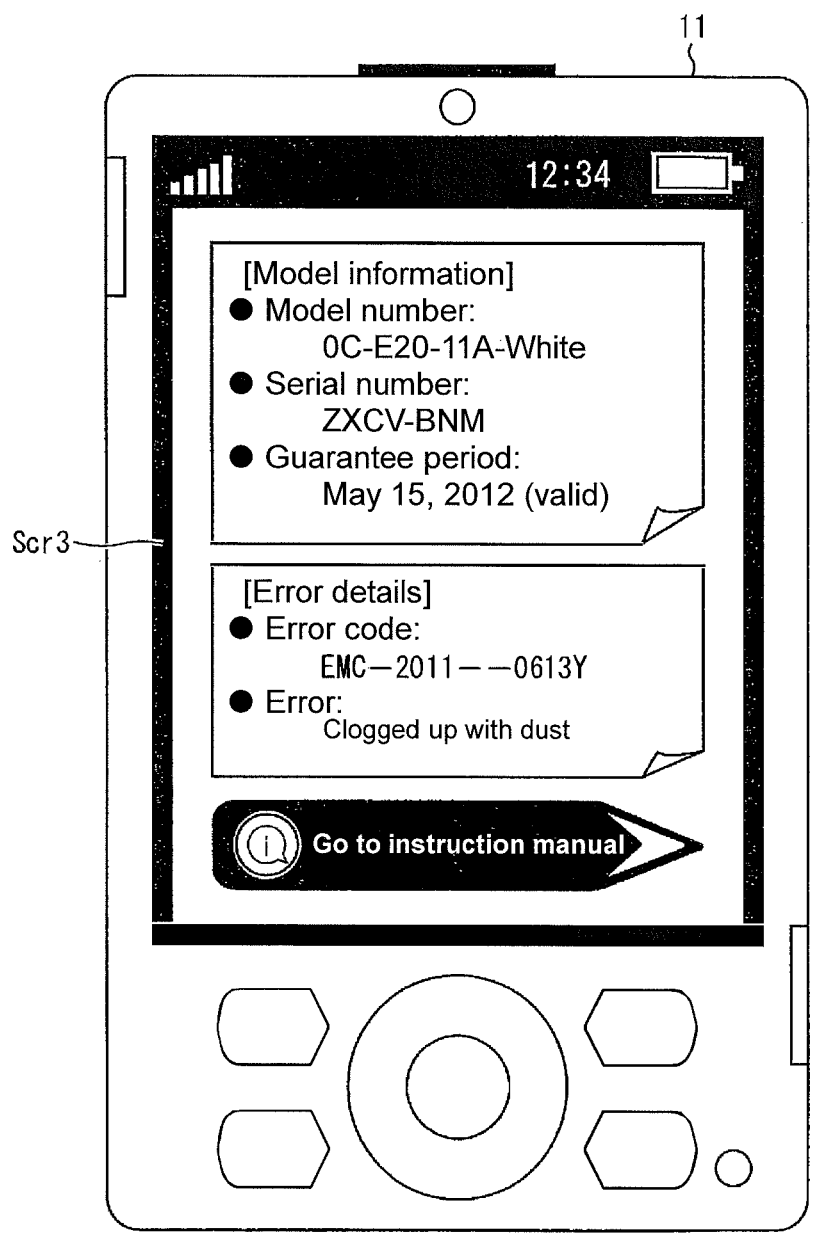
FIG. 19 is a diagram illustrating a specific example of model information/error details screen Scr3 displayed on the display unit by the display control unit.

In response to an occurrence of an event Ev2 in which the input receiving unit 41 receives the user's touch on the screen, the display control unit 40 displays a model information/error details screen Scr3. The model information/error details screen Scr3 includes model information of the electronic apparatus 10 and detailed information of an error currently occurring to the electronic apparatus 10. FIG. 19 illustrates a specific example of the model information/error details screen Scr3. As illustrated in FIG. 19, the display control unit 40 displays the model information including a model number, a serial number, and a guarantee period of the electronic apparatus 10. The display control unit 40 also displays the detailed information of an error including an error code and a detailed description of an error about the error state of the electronic apparatus 10. The model information and the detailed information of the error are previously stored in the IC tag 2 as a result of operation of the data management device 1 of the electronic apparatus 10, then, acquired and stored in the storage unit 16 by the data acquisition control unit 43. That is, in one or more embodiments of the present invention, the data selection unit 22 of the data management device 1 is configured to selects not only the error recovery guide data conforming with an error but also the model information and the detailed information of the error as information to be stored in the IC tag 2 when the state detection unit 21 detects the error state. Further, as illustrated in FIG. 19, the model information/error details screen Scr3 displays a "Go to Instruction Manual" button for the user to touch so that the user can view the error recovery guide data about the error.

Figure 20:
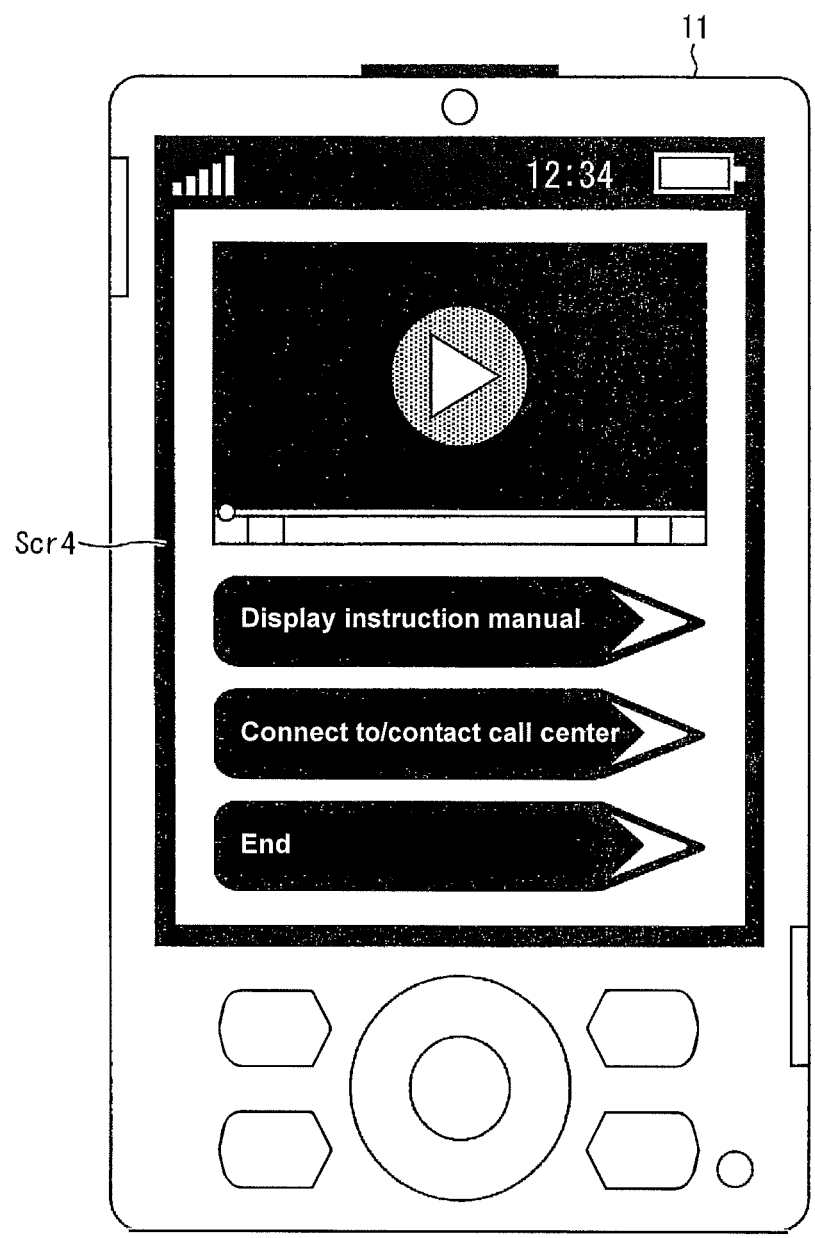
FIG. 20 is a diagram illustrating a specific example of instruction manual display screen Scr4 displayed on the display unit by the display control unit.

In response to an occurrence of an event Ev3 in which the input receiving unit 41 receives a touch on the "Go to Instruction Manual" button, the display control unit 40 displays an instruction manual display screen Scr4. FIG. 20 illustrates a specific example of the instruction manual display screen Scr4. In the example illustrated in FIG. 20, the instruction manual display screen Scr4 displays the error recovery guide data (a moving image or text) acquired from the IC tag 2 in the upper half area of the screen and options from which the user can choose next in the lower half area of the screen.

In the case in which the user wants the error recovery guide data conforming with the currently occurring error to be displayed on the screen, the user touches a "Display Instruction Manual" button illustrated in FIG. 20. In response to an occurrence of an event Ev4 in which the input receiving unit 41 receives a touch on the "Display Instruction Manual" button, the display control unit 40 plays the error recovery guide data (for example, a moving image) in the upper half area of the instruction manual display screen Scr4 (Scr5). When the playback of the error recovery guide data finishes (Ev5), the display control unit 40 may have the screen change from Scr5 to Scr4. In the case where the error recovery guide data is text data, the display control unit 40 displays the text data in the upper half area of the instruction manual display screen as illustrated in FIG. 21 (Scr5).

Figure 21:
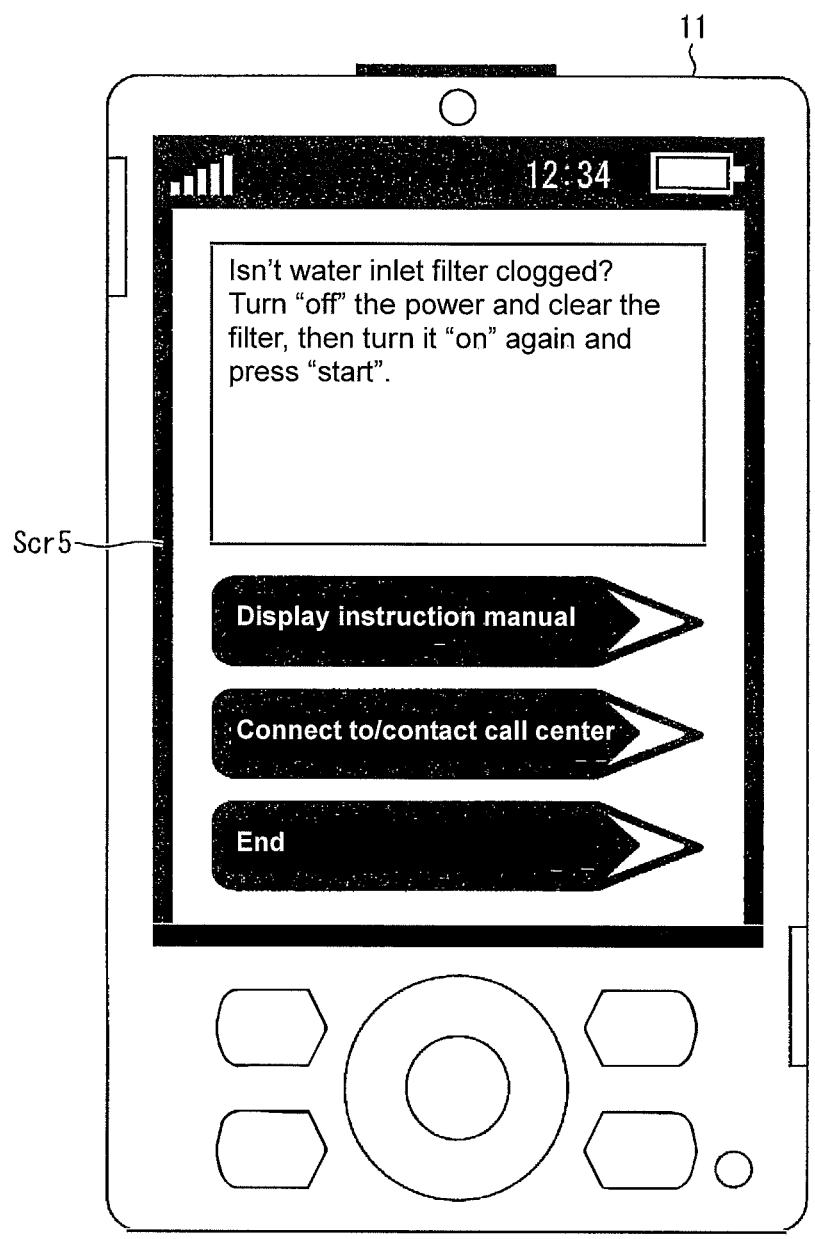
FIG. 21 is a diagram illustrating a specific example of instruction manual display screen Scr5 showing a text and displayed on the display unit by the display control unit.

In the case where the user has taken an action according to the displayed error recovery guide data and succeeded in removing the error, the user only needs to touch an "Exit" button illustrated in FIG. 20 (or FIG. 21). In response to an occurrence of an event Ev6 in which the input receiving unit 41 receives a touch on the "Exit" button, the display control unit 40 transitions the screen from the instruction manual display screen Scr4 to the standby screen Scr1. Then, the communication terminal 11 finishes the error recovery support application program.

Figure 22:
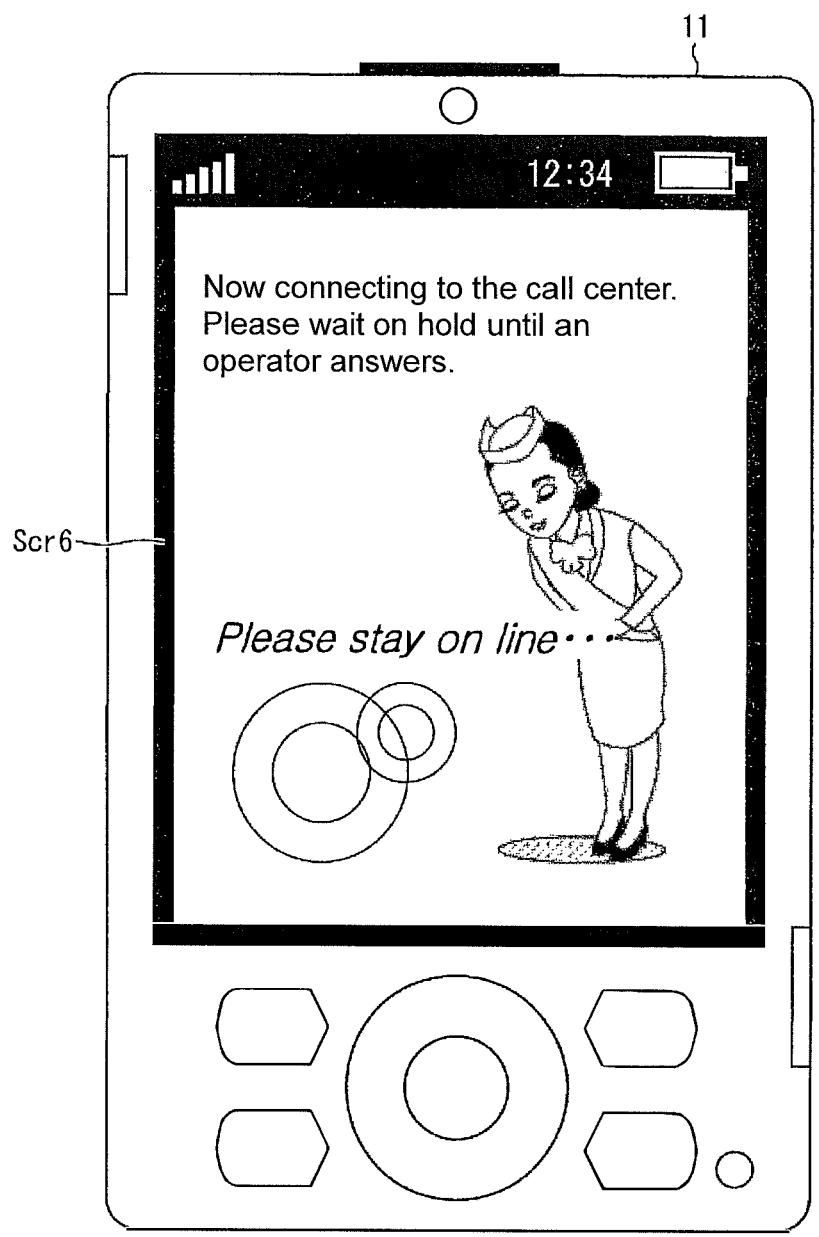
FIG. 22 is a diagram illustrating a specific example of call center calling screen Scr6 displayed on the display unit by the display control unit.

In the case in which the user has not succeeded in removing the error of the electronic apparatus 10 even by referring to the error recovery guide data, the user may touch a "Connect to/Contact Call Center" button illustrated in FIG. 20 (or FIG. 21). In response to an occurrence of an event Ev7 in which the input receiving unit 41 receives a touch on the "Connect to/Contact Call Center" button, the display control unit 40 displays a call center calling screen Scr6. FIG. 22 illustrates a specific example of the call center calling screen Scr6.

While the call center calling screen Scr6 is displayed as a result of the occurrence of the event Ev7, the voice call unit 19 of the data management device 1 performs the call request processing to the call center. On the other hand, the data transmission control unit 42 controls the communication unit 18 to transfer the model information and the detailed information of the error of the electronic apparatus 10 to the call center (the operator terminal 13 or the management server 12). The model information includes, for example, the model number, the serial number, the guarantee period, and location information of the electronic apparatus 10 such as "Customer area; the Kinki Region, Kyoto". The detailed information of the error includes the error code and the description of the error.

Figure 23:
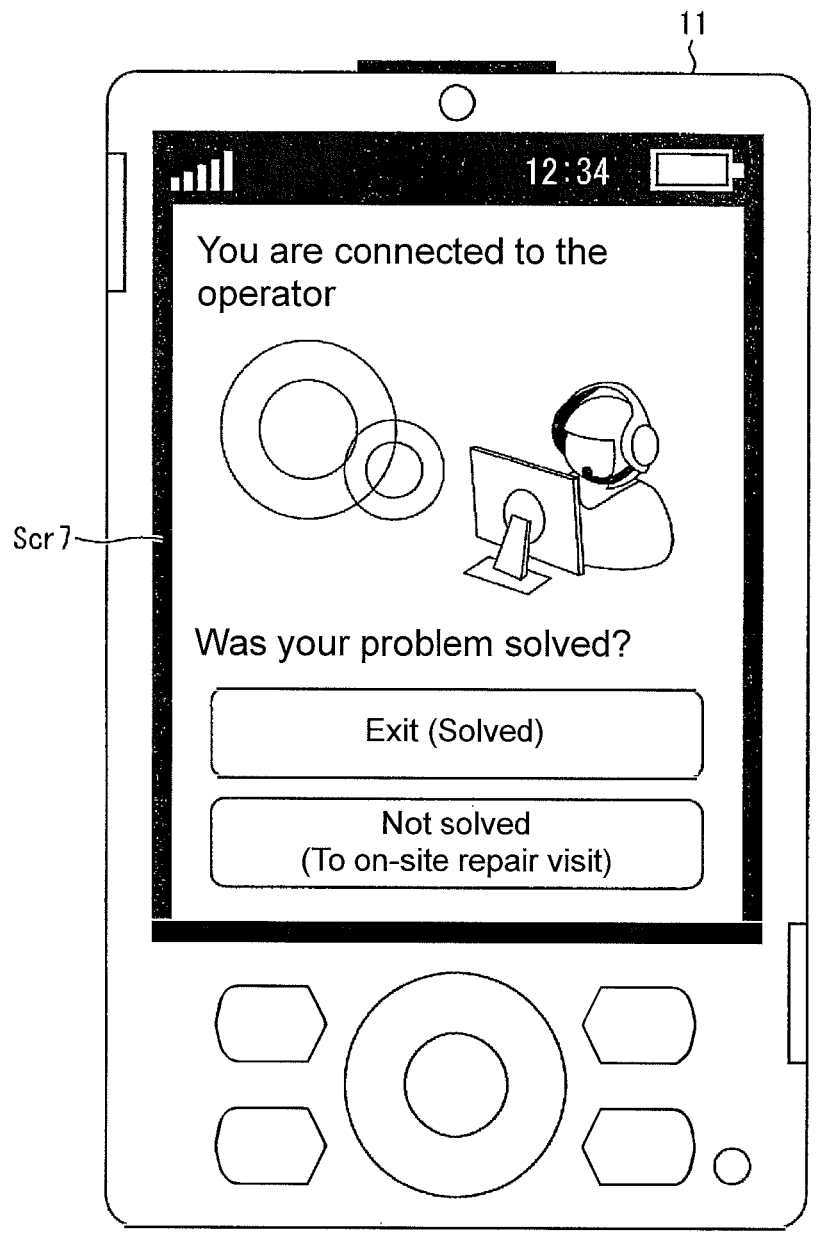
FIG. 23 is a diagram illustrating a specific example of active call screen Scr7 displayed on the display unit by the display control unit.

When the data transmission control unit 42 has transferred the information and also the voice call unit 19 has completed the call request processing and the phone call has gotten through to an operator, an event Ev8 occurs. In response to the occurrence of the event Ev8, the display control unit 40 displays an active call screen Scr7. FIG. 23 illustrates a specific example of the active call screen Scr7.

The user is allowed to speak to the operator and be instructed by the operator about error recovery. In the case where the user has taken an action according to the operator's instruction and succeeded in removing the error, the user only needs to touch an "Exit" button illustrated in FIG. 23. In response to an occurrence of an event Ev9 in which the input receiving unit 41 receives a touch on the "Exit" button, the display control unit 40 transitions the screen from the active call screen Scr7 to the standby screen Scr1. Then, the communication terminal 11 finishes the error recovery support application program.

Figure 24:
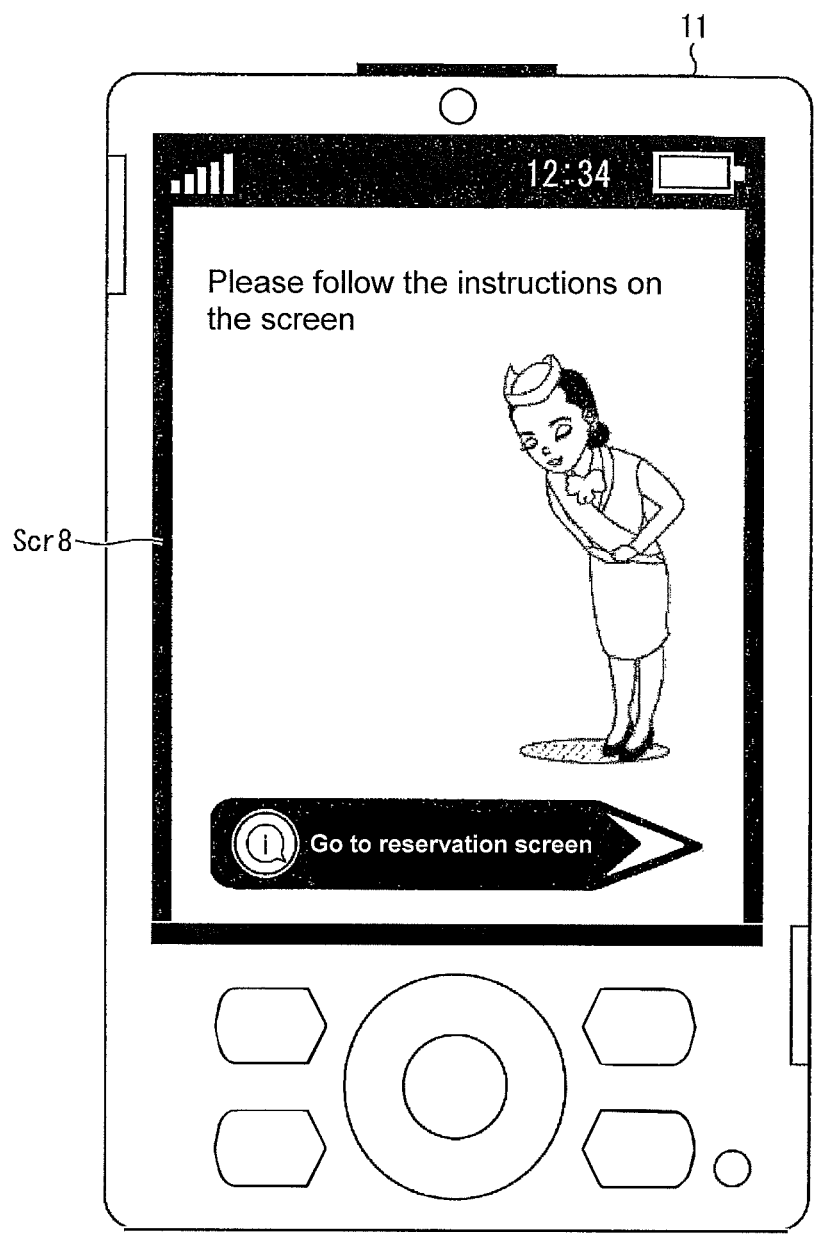
FIG. 24 is a diagram illustrating a specific example of reservation top screen Scr8 displayed on the display unit by the display control unit.

In the case in which the user has not succeeded in removing the error from the electronic apparatus 10 even by following the operator's instruction or that the operator has decided that the electronic apparatus 10 needs to be repaired by a service person, the user may touch a "Not Solved" button illustrated in FIG. 23. In response to an occurrence of an event Ev10 in which the input receiving unit 41 receives a touch on the "Not Solved" button, the display control unit 40 displays a reservation top screen Scr8 on which the user reserves the on-site repair visit. FIG. 24 illustrates a specific example of reservation top screen Scr8.

Figure 25:
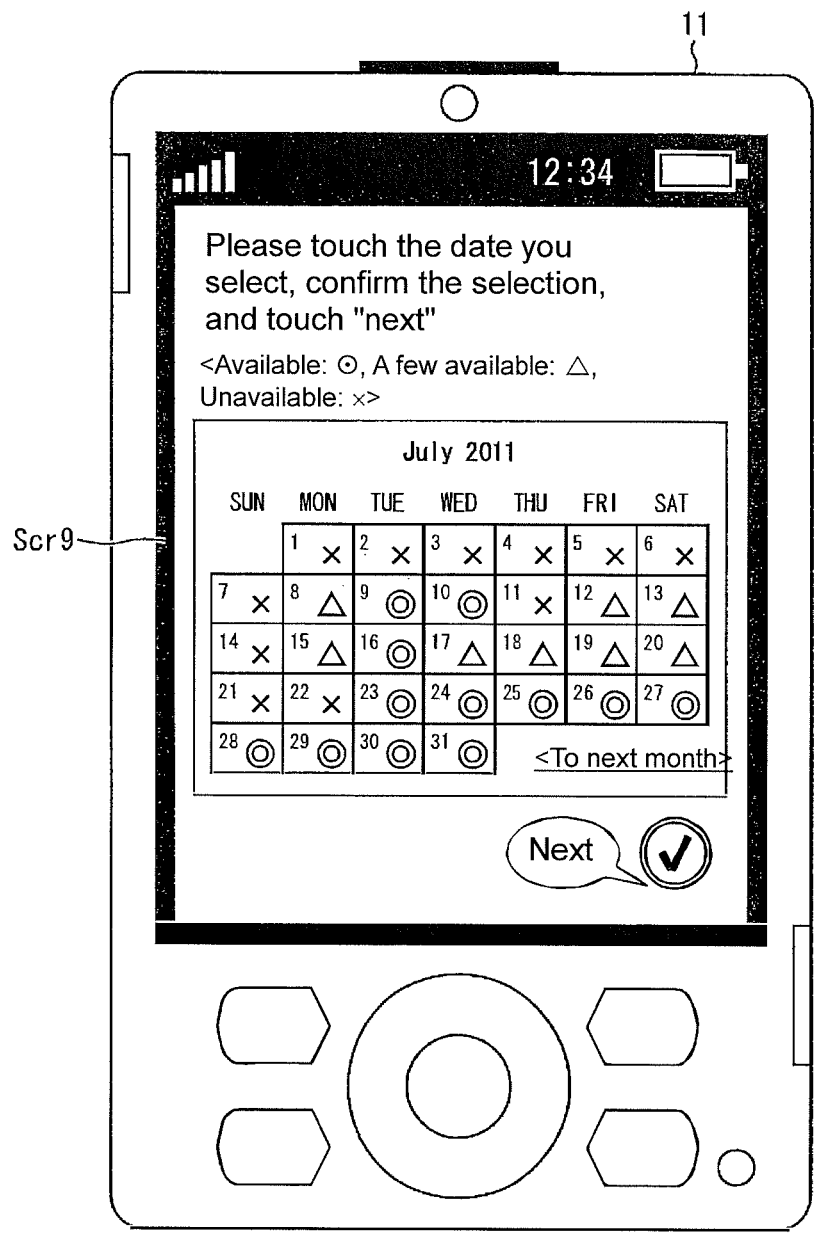
FIG. 25 is a diagram illustrating a specific example of date select screen Scr9 displayed on the display unit by the display control unit.

In the case where the user wants the on-site repair visit, the user only needs to touch a "Go to Reservation Screen" button illustrated in FIG. 24. In response to an occurrence of an event Ev11 in which the input receiving unit 41 receives a touch on the "Go to Reservation Screen" button, the display control unit 40 displays a date select screen Scr9. FIG. 25 illustrates a specific example of date select screen Scr9.

Figure 26:
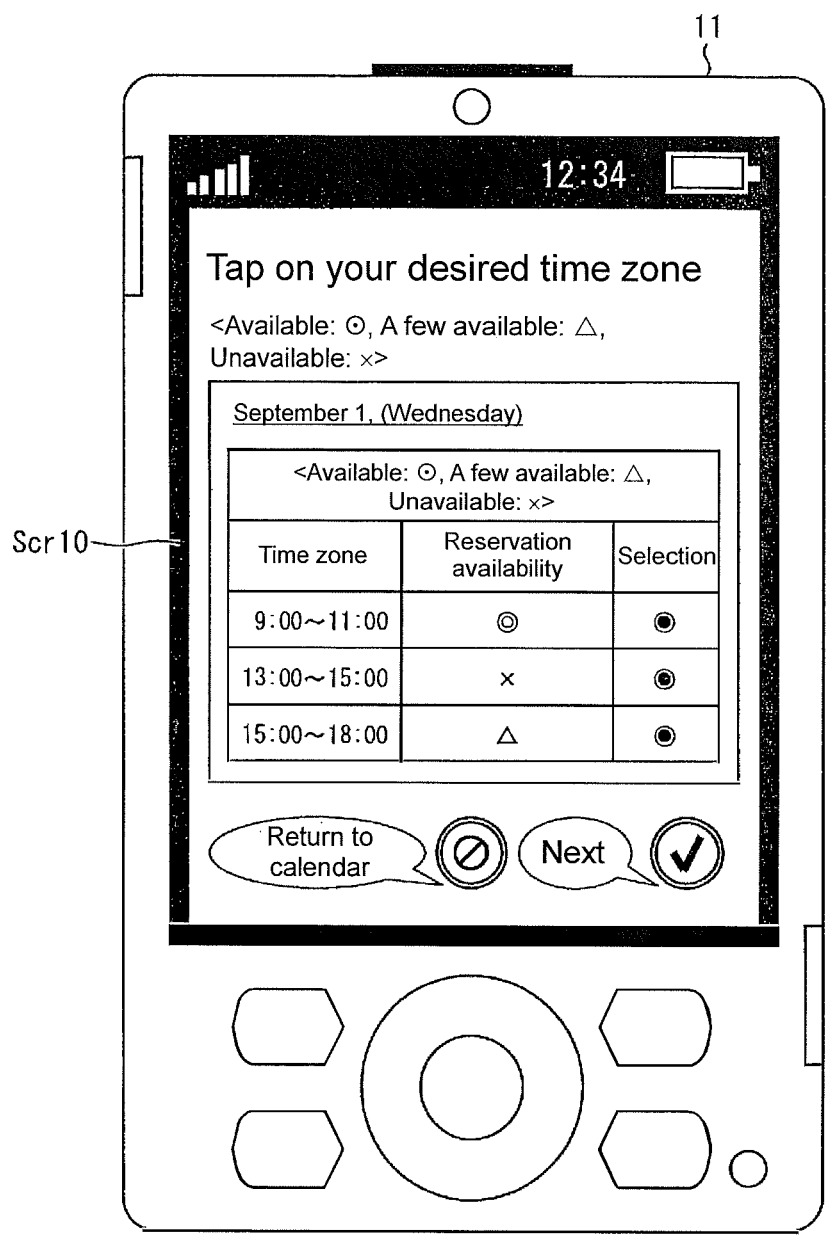
FIG. 26 is a diagram illustrating a specific example of time select screen Scr10 displayed on the display unit by the display control unit.

When the input receiving unit 41 has received a selection of desired date and a touch on a "Next" button on the date select screen Scr9 illustrated in FIG. 25, an event Ev12 occurs. In response to the occurrence of the event Ev12, the display control unit 40 displays a time select screen Scr10. FIG. 26 illustrates a specific example of time select screen Scr10.

In the case where the user cannot make a reservation for the on-site repair visit at a desired time zone on the selected day, the user only needs to touch a "Return to Calendar" button illustrated in FIG. 26. In response to an occurrence of an event Ev13 in which the input receiving unit 41 receives a touch on the "Return to Calendar" button, the display control unit 40 has the screen change from the time select screen Scr10 to the date select screen Scr9.

Figure 27:
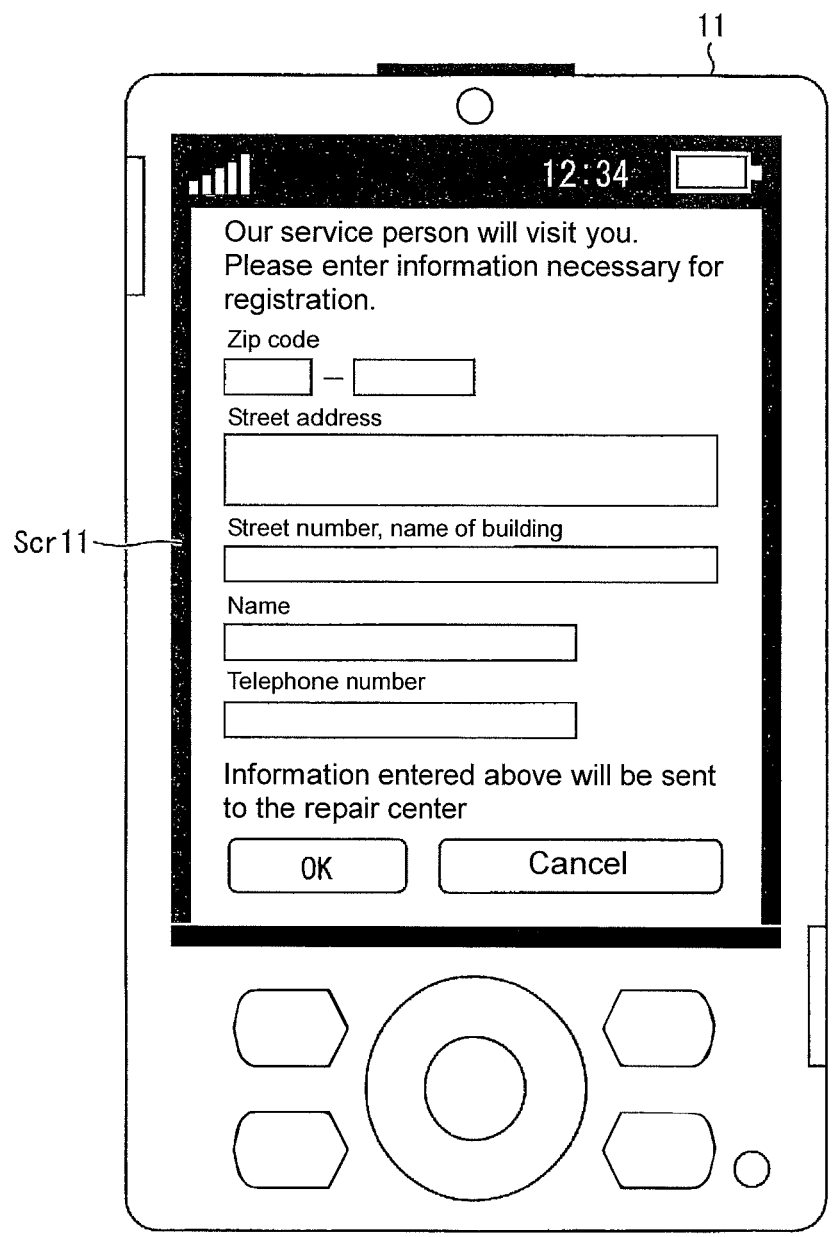
FIG. 27 is a diagram illustrating a specific example of personal information input screen Scr11 displayed on the display unit by the display control unit.

In the case where the user can make a reservation for the on-site repair visit at a desired time zone on the time select screen Scr10 of FIG. 26, the user only needs to touch a "Next" button illustrated in FIG. 26. In response to an occurrence of an event Ev14 in which the input receiving unit 41 receives a touch on the "Next" button, the display control unit 40 displays a personal information input screen Scr11. FIG. 27 illustrates a specific example of personal information input screen Scr11.

On the personal information input screen Scr11 illustrated in FIG. 27, the user fill in the items designated in the text boxes by controlling the input unit 17*a*. In the case where the user does not want to have the personal information registered or where the user wants to redo the reservation from the date selection, the user only needs to touch a "Cancel" button illustrated in FIG. 27. In response to an occurrence of an event Ev15 in which the input receiving unit 41 receives a touch on the "Cancel" button, the display control unit 40 has the screen change from the personal information input screen Scr11 to the reservation top screen Scr8.

When the user enters the personal information and touches an "OK" button, an event Ev16 occurs in which the input receiving unit 41 receives a touch on the "OK" button. Subsequently to the touch on the "OK" button, the entered details (reservation date and time, personal information) received by the input receiving unit 41 are temporarily stored in the storage unit 16 of the communication terminal 11. Then, the data transmission control unit 42 controls the communication unit 18 to transmit the reservation date and time and the personal information temporarily stored in the storage unit 16 to the management server 12.

Figure 28:
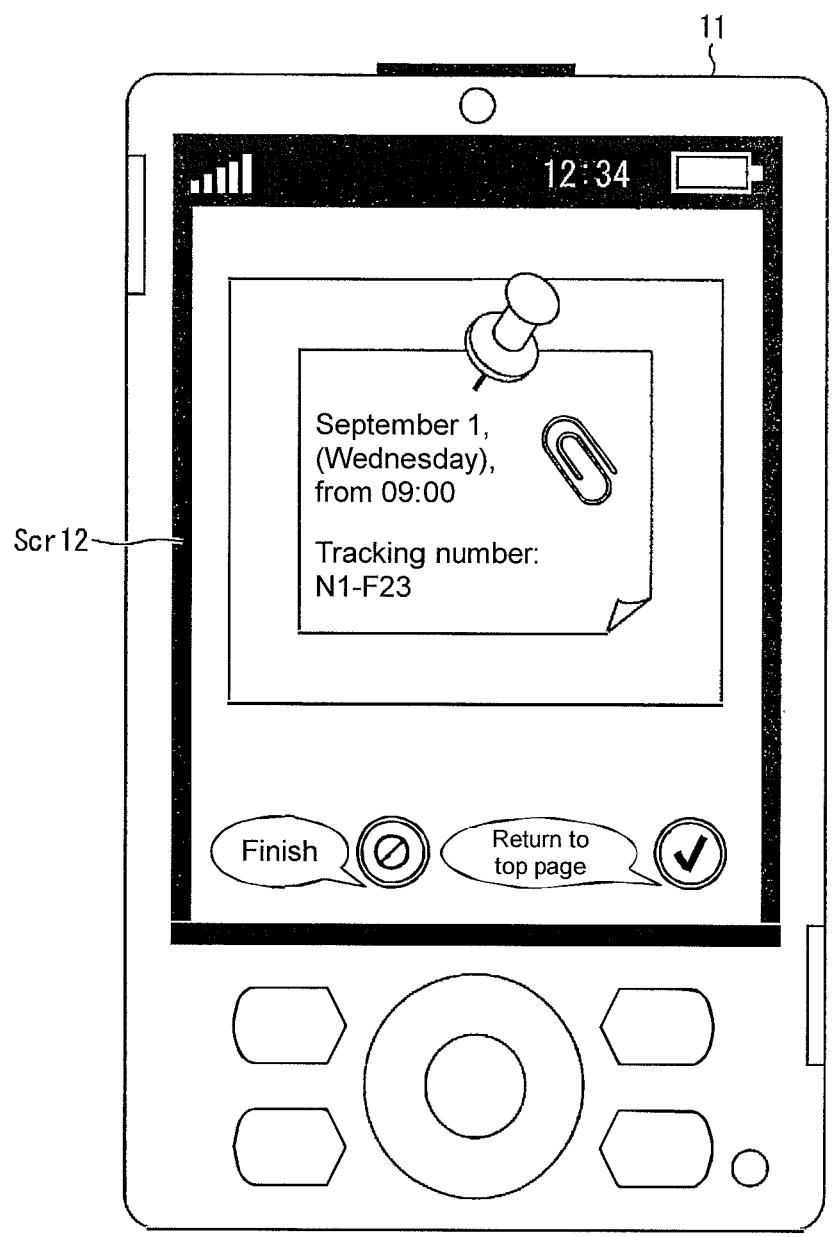
FIG. 28 is a diagram illustrating a specific example of reservation completion screen Scr12 displayed on the display unit by the display control unit.

On the condition where the personal information has been successfully received by the management server 12 subsequent to the occurrence of the event Ev16, the display control unit 40 displays a reservation completion screen Scr12. FIG. 28 illustrates a specific example of reservation completion screen Scr12.

In the case where the user checks and finds that the reservation has completed without any problem, the user only needs to touch a "Finish" button illustrated in FIG. 28. In response to an occurrence of an event Ev17 in which the input receiving unit 41 receives a touch on the "Finish" button, the display control unit 40 transitions the screen from the reservation completion screen Scr12 to the standby screen Scr1. Then, the communication terminal 11 finishes the error recovery support application program.

In the case where the user wants to indicate the detailed information of the error and the like again, the user may touch a "Return to Top Page" button illustrated in FIG. 28. In response to an occurrence of an event Ev18 in which the input receiving unit 41 receives a touch on the "Return to Top Page" button, the display control unit 40 has the screen change the reservation completion screen Scr12 back to the top screen Scr2.

Meanwhile, the communication terminal 11 may be configured to display the date and time select screens (Scr9 and Scr10) or the personal information input screen Scr11 again before transmitting the reservation date and time and the personal information to the management server 12, so that the user can check or correct the reservation date and time and the personal information. In the case where the apparatuses of the error recovery support system 100 are provided with a function of correcting the reservation after the user has completed the reservation, the display control unit 40 of the communication terminal 11 may be configured to be provided a button for selecting the reservation correction function on the reservation top screen Scr8.

Although an example in which the communication terminal 11 transmits the reservation date and time and the personal information to the management server 12 has been described above, the communication terminal 11 may be configured to transmit them to the operator terminal 13. Alternatively, the communication terminal 11 may be configured to transmit them to both the management server 12 and the operator terminal 13.

With the above described configuration and method, the communication terminal 11 can first provide the user with a first error recovery support tool by acquiring the error recovery guide data of contents conforming with the state of the electronic apparatus 10 detected at the occurrence of the error and displaying the data on the display unit 17*b*. Further, the communication terminal 11 can provide the user with the second error recovery support tool by supplying the model information and the detailed information of the error acquired from the electronic apparatus 10 to the call center (the operator terminal 13 or the management server 12) and communicating with the operator terminal 13. Still further, the communication terminal 11 can provide the user with the third error recovery support tool which enables the user to reserve the on-site repair visit of a service person (repair technician) by simple operation.

As a result, it is possible to set up the error recovery support system 100 configured to be capable of further providing an error recovery support tool for the user in preparation for a case where only providing the user with data read out from the IC tag 2 is not enough for the user to remove the error. Therefore, one or more embodiments of the present invention has an effect of enabling user convenience to be improved by making use of the RFID technology.

In one or more of the above described embodiments, the data management unit 23 is configured to delete previously stored data and write new data in storing selected data in the IC tag 2. As a result, the memory of the IC tag 2 needs to have only a small storage capacity and, therefore, the IC tag 2 can be made at low cost.

However, in the case where the memory of the IC tag 2 has enough storage capacity to store a plurality of data units, the data management unit 23 is not limited to the above described configuration and may be configured to add new data to previously stored data without deleting the previously stored data from the IC tag 2.

With the above described configuration, the IC tag 2 stores the respective data units corresponding to a plurality of states in which the electronic apparatus 10 has once experienced transitions. That enables the communication terminal 11 to acquire the plurality of data units corresponding to the past states from the IC tag 2. For example, it is assumed that the state of the electronic apparatus 10 has changed as the normal operating state→the error state "does not operate"→the error state "water is not supplied". In this case, the data management unit 23 responds to a change in the state of the electronic apparatus 10 by sequentially adding the instruction manual data, the error recovery guide data A, and the error recovery guide data C to the IC tag 2. Finally, the IC tag 2 stores the three data units. When the RF reader/writer unit 3 of the communication terminal 11 communicates with the IC tag 2 of that state, the RF reader/writer unit 3 can read any of the three data units as required. That is, the communication terminal 11 can read the instruction manual data corresponding to the normal operating state by tracing back two states from the present state of the electronic apparatus 10.

Incidentally, when the IC tag 2 stores a plurality of types of data, the communication terminal 11 is configured as below. The data acquisition control unit 43 of the communication terminal 11 detects and confirms, for example, that the IC tag 2 stores the three types of data and notifies the display control unit 40 of that recognition. The display control unit 40 displays a GUI screen for the user to select which of the three types of data is to be acquired on the display unit 17*b*. The input receiving unit 41 responds to the selection of data desired by the user by notifying the data acquisition control unit 43 of the selection. The data acquisition control unit 43 controls the RF reader/writer unit 3 to read the data selected by the user from the IC tag 2. Alternatively, the communication terminal 11 may be configured as below. The data acquisition control unit 43 reads all of the three types of data stored in the IC tag 2 from the IC tag 2 and temporarily stores them in the storage unit 16 of the communication terminal 11. Then, the display control unit 40 displays a GUI screen on the display unit 17*b* to allow the user to select which of the three types of data is to be displayed. The input receiving unit 41 responds to the selection of data desired by the user by notifying the display control unit 40 of the selection. The display control unit 40 reads the data selected by the user from the storage unit 16 and displays the data on the display unit 17*b*.

Yet alternatively, the data management unit 23 may be configured to manage an input/output log of data in the IC tag 2. Then, the data management unit 23 may identify a data unit of relatively low priority based on the log and delete the data unit from the IC tag 2 with right timing to increase an available memory in the case where the memory capacity of the IC tag 2 is nearly exhausted.

For example, the data management unit 23 may identify the data unit which has been stored for the longest time period as a target data unit for deletion. The data management unit 23 may identify the data unit which has not been read out from the communication terminal 11 for the longest time period as a target data unit for deletion. The data management unit 23 may identify the data unit which has been read out the least number of times as a target data unit for deletion.

In one or more embodiments of the present invention, the data management device 1 is configured to cause the state monitoring unit 24 to store the monitoring results which is obtained by monitoring the electronic apparatus 10 in the state history storage unit 33 of the storage unit 6.

However, the data management device 1 is not limited to that configuration and may be configured to cause the data management unit 23 to store the monitoring results obtained by the state monitoring unit 24 in the IC tag 2. Alternatively, the data management device 1 may be configured to cause the state monitoring unit 24 to store the monitoring results in the state history storage unit 33 of the storage unit 6 and also cause the data management unit 23 to store the same monitoring results in the IC tag 2. As described above, the monitoring results are information including the state history, the total operation hours, and the total operation days, as listed in FIG. 12, for example.

With the above described configuration, even though the electronic apparatus 10 encounters an error so serious that the power supply is cut off, the communication terminal 11 can read information including the state history, the total operation hours, and the total operation days from the IC tag 2. The history information of the electronic apparatus 10 is useful for determining the cause of the error and judging an effective measure. Therefore, even though the power supply of the electronic apparatus 10 is cut off, the data management device 1 has an effect of enabling the communication terminal 11 to acquire information useful for removing the error from the IC tag 2.

Further, the state analyzing unit 25 is configured to predict that the electronic apparatus 10 is "highly possible that the power supply is cut off" based on a scenario of occurrence of an error so serious that the power supply is cut off. Therefore, it is desired that the data management unit 23 is configured to save the information including the state history, the total operation hours, and the total operation days to the IC tag 2 only in the case where the state analyzing unit 25 has predicted that the power supply of the electronic apparatus 10 will be cut off. Further, it is desired that the data management unit 23 is configured to also save the model information and the like to the IC tag 2 in the case where the data selection unit 22 has selected other data (the model information and the like) which is required for repair.

With the above described configuration, in the case where the power supply might be cut off, the information including the state history, the total operation hours, and the total operation days which takes the highest priority under the condition that the power supply will be cut off can be saved to the IC tag 2, whereas in the case where the power supply might not be cut off, an available capacity of the IC tag 2 can be allocated to store other necessary data.

According to one or more embodiments of the present invention, the data management device 1 may be configured to store the monitoring results illustrated in FIG. 12 as the state history and also store the stored monitoring results in the IC tag 2.

In one or more embodiments of the present invention, the data management device 1 is configured to update the data in the IC tag 2 according to the state of the electronic apparatus 10 after a change at the timing of an occurrence of the change to the state of the electronic apparatus 10 (at the timing of an occurrence of the error to the electronic apparatus 10). Alternatively, according to one or more embodiments of the present invention, the data management device 1 is configured to regularly update the data in the IC tag 2 independent of the timing of a change in (an occurrence of an error to) the state of the electronic apparatus 10.

The configuration of the data management device 1 is not limited to any of the configurations. For example, the data management device 1 is capable of maintaining the contents of the IC tag 2 much more accurate with a configuration combining embodiments of the present invention.

More specifically, the data management device 1 is configured to regularly detect the state of the electronic apparatus 10 to update the data in the IC tag 2, and on the condition that a change has occurred in the state of the electronic apparatus 10 before the next regular update timing, the device is also configured to update the data of the IC tag 2 at any timing.

For example, the data management device 1 regularly (at intervals of t minutes) detects the state of the electronic apparatus 10 regardless of the presence or absence of an error and stores the data conforming with the state at the time of detection in the IC tag 2. Here, it is assumed that an error Z has occurred in the electronic apparatus 10 before the next regular state detection time. On the condition that the error Z is so serious that the power supply is cut off, the data management device 1 is unable to operate. Therefore, in that case, the communication terminal 11 can read the data based on the last regular state detection from the IC tag 2.

The data stored in the IC tag 2 conforms with the state of the electronic apparatus 10 at oldest at t minutes before the occurrence of the serious error Z and includes necessary information or high priority information corresponding to the preceding state which is the closest to the final state of the electronic apparatus.

On the condition that the error Z is so minor that the power supply can be kept, the data management device 1 is able to continue performing a data managing process. Therefore, in that case, the state detection unit 21 of the data management device 1 detects the state in which the error Z has occurred and the data selection unit 22 selects the error recovery guide data corresponding to the error Z based on the selection rules. Then, the data management unit 23 is able to write the error recovery guide data of contents conforming with the error Z in the IC tag 2 immediately after the occurrence of the error Z without waiting for the next regular detection time.

With the configuration, the data conforming with the latest state of the electronic apparatus 10 can be always stored in the IC tag 2 as far as the power is supplied to the electronic apparatus 10, whereas the data conforming with the preceding state of the electronic apparatus 10 which is the closest to the latest state of the electronic apparatus 10 can be stored in the IC tag 2 in preparation for a case where the power is not supplied to the electronic apparatus 10. Therefore, the data management device 1 is capable of realizing the data management much more accurate and highly convenient to the user.

One or more of the above described embodiments are configured to cause the electronic apparatus 10, which is the target apparatus, to store the respective types of data about the electronic apparatus in the data storage unit 32 of the electronic apparatus 10.

However, in the error recovery support system 100 according to one or more embodiments of the present invention, the electronic apparatus 10 need not hold all necessary data in itself.

For example, the error recovery support system 100 may be configured to cause the management server 12 to hold all or part of the data associated with the electronic apparatus 10 and to cause the communication terminal 11 to acquire necessary data from the management server 12 over a wide area communication network 14.

In that case, the electronic apparatus 10 stores a "data ID" for identifying the respective types of data, a "data name", and a "URL (uniform resource locator)" for indicating the location of the data and the like for each data, instead of storing the respective types of data in the data storage unit 32.

When the state detection unit 21 of the electronic apparatus 10 has detected the state of the electronic apparatus 10, the data selection unit 22 selects the data conforming with the detected state based on the selection rules. Then, the data management unit 23 writes the "data ID", the "data name", or the "URL" of the selected data in the IC tag 2.

The RF reader/writer unit 3 of the communication terminal 11 reads the "data ID", the "data name", or the "URL" store in the IC tag 2. Based on the "data ID", the "data name", or the "URL" read from the IC tag 2, the communication terminal 11 can identify the type of the data conforming with the present state of the electronic apparatus 10.

In that case, the data transmission control unit 42 of the communication terminal 11 requests data necessary to use the present electronic apparatus 10 from the management server 12 by using the "data ID", the "data name", or the "URL". Then, the communication terminal 11 can acquire the data of contents conforming with the state of the electronic apparatus 10 from the management server 12 via the communication unit 18.

With the above described configuration, the error recovery support system 100 can further reduce the amount of information of the data to be stored in the IC tag 2.

Further, the error recovery support system 100 incorporating the configurations of the data selection unit 22, the selection rule storage unit 31, and the data storage unit 32 which are installed in the electronic apparatus 10 as the data management device 1 into the management server 12 also falls within the scope of the present invention.

In that error recovery support system 100, the state detection unit 21 of the electronic apparatus 10 writes information indicating the detected state of the electronic apparatus 10 in the IC tag 2 via the data management unit 23.

The communication terminal 11 reads the information indicating the state of the electronic apparatus 10 written in the IC tag 2 via the RF reader/writer unit 3, then, the data transmission control unit 42 transmits the read out state identification information to the management server 12 to request necessary data from the management server 12.

The data selection unit 22 of the management server 12 selects data necessary to use the present electronic apparatus 10 based on the state identification information of the electronic apparatus 10 transmitted from the communication terminal 11 according to the selection rules stored in the selection rule storage unit 31. The management server 12 reads out the data selected by the data selection unit 22 from the data storage unit 32 of itself and transmits the data to the communication terminal 11 as a response to the request.

With the above described configuration, the communication terminal 11 can always grasp the state of the electronic apparatus 10 by reading the state identification information from the IC tag 2, therefore, can promptly request and acquire necessary information according to the state of the electronic apparatus 10 from the management server 12.

The present invention is not limited to the above described embodiments and various changes to the embodiments are possible without departing from the scope defined by the claims, therefore, embodiments which are combinations of the technical means disclosed by the different embodiments also fall within the technical scope of the invention.

[Implementations by Software Programs]

Finally, the blocks in the data management device 1 or the communication terminal 11, particularly the state detection unit 21, the data selection unit 22, the data management unit 23, the state monitoring unit 24, and the state analyzing unit 25 in the data management device 1 and the display control unit 40, the input receiving unit 41, the data transmission control unit 42, and the data acquisition control unit 43 in the communication terminal 11 may be configured by hardware logics or may be realized by software programs by using a CPU as below.

That is, the data management device 1 (or the communication terminal 11) has a CPU (central processing unit) for executing instructions from control programs which realize the respective functions, a ROM (read only memory) storing the programs, a RAM (random access memory) in which the programs are expanded, and storage (recording medium) such as a memory for storing the programs and the respective types of data. According to one or more embodiments of the present invention, a recording medium records program codes (a program in an executable form, an intermediate code program, a source program) of a control program for the data management device 1 (or the communication terminal 11), which is a software program for realizing the above described functions, in a computer readable fashion to the data management device 1 (or the communication terminal 11) for the computer (or the CPU or the MPU) to read and execute the program codes recorded on the recording medium.

As the recording medium, a tape type medium such as a magnetic tape or a cassette tape, a disk type medium including a magnetic disk such as a floppy (registered trademark) disk/a hard disk and an optical disk such as a CD-ROM/an MO/an MD/a DVD/a CD-R, or semiconductor memory such as a mask ROM/an EPROM/an EEPROM/a flash ROM can be used.

Also, the data management device 1 (or the communication terminal 11) may be configured to connect with a communication network so that the program codes are supplied over the communication network. The communication network is not particularly limited and may be, for example, the Internet, an intranet, an extranet, a LAN, an ISDN, a VAN, a CATV communication network, a virtual private network, a telephone network, a mobile telephone network, a satellite communication network, and the like. As transmission media forming the communication network are not particularly limited and may include, for example, a wired medium such as the IEEE1394, a USB, a power-line carrier, a cable television line, a telephone line, and an ADSL line, or a wireless medium such as an infrared media including IrDA and a remote controller, Bluetooth (registered trademark), 802.11 wireless medium, an HDR, a mobile telephone network, a satellite channel, a digital terrestrial network. The present invention may be also realized in a form of computer data signals embedded in a carrier wave which is embodied by the program codes in a form of digital transmission.

The configurations below also fall within the scope of the present invention.

Further, the state detection unit of the data management device may detect at least whether the state of the electronic apparatus is the normal operating state in which the electronic apparatus normally operates or the error state in which the electronic apparatus has an error, and on the condition that the state detection unit has detected the error state, the data selection unit may select error recovery guide data including information to recover from the error from the data storage unit by referring to the selection rules.

With the configuration, the state detection unit can detect at least two states: a first state is the normal operating state indicating that the electronic apparatus normally operates; and a second state is the error state indicating that the electronic apparatus has an error.

The state detection unit detects whether the electronic apparatus is in the normal operating state or in the error state. Then, on the condition that the state detection unit has detected that the electronic apparatus is in the error state, the data selection unit is configured to select error recovery guide data including information to recover from the error from the data storage unit by referring to the selection rules. That is, in this configuration, the error state is associated with the error recovery guide data in the selection rules.

Then, the selected error recovery guide data is stored in the contactless storage medium by the data management device.

Therefore, on the condition that the electronic apparatus is in the error state, the contactless storage medium always stores data including information of contents conforming with the state. In this case, the data is the error recovery guide data including the information to recover from the error.

The information currently needed by the user who is using the electronic apparatus under the error state is the error recovery guide data including the information to recover from the error.

Therefore, the data management device can manage data to immediately present necessary information to the user according to the state of electronic apparatus. As a result, the data management device has an effect of enabling user convenience to be improved in the uses of the electronic apparatus.

Further, according to one or more embodiments of the present invention, the data storage unit of the data management device stores a plurality of types of error recovery guide data for each type of the errors of the electronic apparatus, and on the condition that the electronic apparatus is in the error state, the state detection unit identifies the type of the occurring error, and the data selection unit selects error recovery guide data including information to recover from the type of error identified by the state detection unit from the data storage unit by referring to the selection rules.

With the configuration and the method, the state detection unit can detect whether the electronic apparatus is in the normal operating state or the error state, and on the condition that the state detection unit has detected the error state, the state detection unit can identify the type of the occurring error to detect what kind of error is occurring.

Then, the data storage unit stores a plurality of error recovery guide data units for respective types of errors to occur in the electronic apparatus, therefore, the selection rules include information of error recovery guide data conforming with each type of errors.

When the electronic apparatus is in the error state, the state detection unit identifies the type of errors occurred on the electronic apparatus, so that the data selection unit can select error recovery guide data conforming with the type of error encountered by the electronic apparatus. The error recovery guide data conforming with the type of error encountered by the electronic apparatus is the error recovery guide data including information needed to recover from the type of error.

Therefore, on the condition that the electronic apparatus is in the error state, the contactless storage medium always stores data including information of contents specialized in the state of the occurring error. In this case, the data is the error recovery guide data including the information to recover from the error being occurring.

Given that the type of error to occur in the electronic apparatus varies and an error recovery guide data unit contains information about all the possible errors, the user has to deal with a troublesome task of searching out necessary information from a huge amount of error recovery guide data.

However, with the data management device according to one or more embodiments of the present invention, the user is released from a troublesome task of searching out necessary information from the huge amount of error recovery guide data in which currently unnecessary information is mixed with the necessary information. This is because, since the contactless storage medium stores the error recovery guide data including the information to recover from the present error, the user only needs to read that data.

Further, since the data management device is adapted to store only the necessary information in the contactless storage medium for a period of time when the information is needed, the contactless storage medium needs not to store the huge amount of error recovery guide data; and the problem of the memory capacity of the contactless storage medium is also solved.

As described above, the data management device can manage data to immediately present necessary information to the user according to the state of the electronic apparatus. As a result, the data management device has an effect of solving the problem of the memory capacity and also enabling user convenience to be further improved in the uses of the electronic apparatus.

A configuration causing the contactless storage medium to store a data ID for identifying the error recovery guide data, a data name, a URL for acquiring the error recovery guide data, or the like, instead of the error recovery guide data also falls within the scope of the present invention. In that configuration, although the user cannot directly access information for recovering from the present error only by reading out the data stored in the contactless storage medium, the user can acquire the data ID for identifying the error recovery guide data, the data name, the URL for acquiring the error recovery guide data, or the like, from the contactless storage medium. Therefore, the user can easily identify and acquire necessary error recovery guide data according to the present state of the electronic apparatus by using "the data of contents conforming with the state of the electronic apparatus", i.e., the data ID, the data name, the URL, or the like acquired from the contactless storage medium. As a result, the configuration can achieve almost the same effect as that of the above described configurations. That is, the data management device has an effect of managing data to immediately present necessary information to the user according to the state of electronic apparatus, and as a result, enabling user convenience to be further improved in the uses of the electronic apparatus.

Alternatively, the state detection unit of the data management device is designed for obtaining transitions of the state of the electronic apparatus by continuously monitoring the electronic apparatus, and may include a state analyzing unit configured to regularly detect a state reflecting a long-term tendency of the electronic apparatus by analyzing the obtained transitions of the state, and every time the state analyzing unit detects the state reflecting the long-term tendency, the data selection unit may select data conforming with the detected state from the data storage unit by referring to the selection rules, and the data management unit may store the selected data in the contactless storage medium.

With the configuration, the state detection unit regularly monitors and detects the state of the electronic apparatus 10. Specifically, the state detection unit obtains transitions of the state of the electronic apparatus by monitoring the state of the electronic apparatus. Then, the state analyzing unit regularly detects not a transient state but the state reflecting a long-term tendency of the electronic apparatus by analyzing the obtained transitions of the state. The state reflecting a long-term tendency refers to information indicating a long-term tendency of a state of error occurrence in the electronic apparatus such as what kind of error occurs when and how many times (frequency) the error occurs.

Therefore, every time the state reflecting a long-term tendency is regularly detected, the data selection unit selects data conforming with the detected state, and the data management unit stores the selected data in the contactless storage medium.

As a result, the data management device can regularly (for example, at intervals of several seconds to several minutes) update the data of the contactless storage medium according to the state of the electronic apparatus as the state detection is regularly performed. That is, the data management device can obtain a long-term tendency of errors occurred in the electronic apparatus and keep the contactless storage medium always storing data including contents conforming with that tendency of errors.

Even in the case where the power supply of the electronic apparatus itself has been cut off due to an occurrence of serious error, necessary data can still be read from the contactless storage medium mounted to the electronic apparatus.

Moreover, the contactless storage medium regularly (for example, at intervals of several seconds to several minutes) updates data of contents to suit the state at that time point.

Therefore, the contactless storage medium stores data of contents conforming with the state of the electronic apparatus detected at oldest at t minutes (seconds) before the occurrence of the serious error (at the time point of power off), i.e., the preceding state, which the user can read out.

As a result, the data management device can realize more accurate data management so that data stored in the contactless storage medium includes necessary information corresponding to the preceding state which is the closest to the final state of the electronic apparatus.

Alternatively, the state detection unit of the data management device may respond to a case where the state of the electronic apparatus transitions to another state by detecting the state after the transition, and every time the state detection unit detects the state after the transition, the data selection unit may select data conforming with the detected state after the transition from the data storage unit by referring to the selection rules, and the data management unit may store the selected data in the contactless storage medium.

With the configuration, the data management device responds to a case where the state of the electronic apparatus transitions to another state by detecting the state after the transition. Then, every time the state is detected, the data selection unit selects data conforming with the detected state, and the data management unit stores the selected data in the contactless storage medium. In the case where an event of state transition has occurred to the electronic apparatus and the extent of the event is not significant so that the power supply can be maintained, the data management device is able to continue the data managing process. Therefore, in that case, the data management unit stores the new data selected according to the latest detected state in the contactless storage medium.

As described above, with the configuration, the data conforming with the latest state of the electronic apparatus can be always stored in the IC tag 2 as far as the power is supplied to the electronic apparatus. Therefore, the data management device is capable of realizing the data management highly convenient for the user.

Further, the data management device has an effect below when the state detection unit is provided with the configuration of regularly detecting the state together with the configuration of detecting the state after a transition when the state of the electronic apparatus transitions to another state.

With the configuration, firstly, the data management device causes the state detection unit to use the state monitoring unit and the state analyzing unit to regularly (for example, at intervals of t minutes) detect the state of the electronic apparatus regardless of the presence or absence of state transition (occurrence of an error, return to the normal operation). Then, every time the state is detected, the data selection unit selects data conforming with the detected state, and the data management unit stores the selected data in the contactless storage medium. Secondly, the data management device responds to a case where the state of the electronic apparatus transitions to another state by detecting the state after the transition regardless of the regular state detection time. Then, every time the state is detected, the data selection unit selects data conforming with the detected state, and the data management unit stores the selected data in the contactless storage medium.

In the above described manner, data management device regularly detects the state of the electronic apparatus and regularly updates data to be stored in the contactless storage medium according to the detected state. Further, in the case where an event of state transition has occurred to the electronic apparatus and the extent of the event is not significant so that the power supply can be maintained, the data management device is able to continue the data managing process. Therefore, in that case, the data management unit stores the new data selected according to the latest detected state in the contactless storage medium.

As a result, the data management unit is able to write the data of contents conforming with an event of state transition (for example, an error) in the contactless storage medium immediately after the occurrence of the event without waiting for the next regular detection time.

On the condition that the error is so serious that the power supply is cut off, the data management device is unable to operate. Therefore, in that case, the data written immediately before the power was cut off can be read out from the contactless storage medium.

As described above, with the configuration, the data conforming with the latest state of the electronic apparatus can be always stored in the IC tag 2 as far as the power is supplied to the electronic apparatus, whereas the data conforming with the preceding state of the electronic apparatus which is the closest to the latest state of the electronic apparatus can be stored in the contactless storage medium in preparation for a case where the power is not supplied to the electronic apparatus. Therefore, the data management device is capable of realizing the data management much more accurate and highly convenient for the user.

Further, according to one or more embodiments of the present invention, the data management unit of the data management device stores a state history indicating the transitions of the state of the electrical apparatus detected by the state detection unit in the contactless storage medium.

With the configuration, not only the data stored in the data storage unit but also the state history are stored in the contactless storage medium, therefore, even though that the power supply to the electronic apparatus is cut off, the user is allowed to acquire the data as well as the state history from the contactless storage medium by using a user support device equipped with an RF reader unit or the like. At the time when the power supply to the electronic apparatus has been cut off, the state history indicating how the electronic apparatus has operated before that time point is useful and necessary information.

Therefore, the data management device has an effect of managing data to immediately present necessary information to the user according to the state of electronic apparatus.

A contactless storage medium which is mounted to an electronic apparatus and stores data including information conforming with a state of the electronic apparatus according to the state based on control of any of the above described data management devices also falls within the scope of the present invention.

An electronic apparatus including any of the above described data management devices also falls within the scope of the present invention.

An apparatus user support system including: an electronic apparatus including any of the above described data management devices; and a communication terminal including an RF reader unit configured to read data from a contactless storage medium mounted to the electronic apparatus also falls within the scope of the present invention.

The data management device may be realized by a computer. In that case, a control program of the data management device for causing a computer to function as respective units to realize the data management device by the computer, and a computer readable recording medium recording the control program also fall within the scope of the present invention.

The data management device according to one or more embodiments of the present invention is installed in a target apparatus so that it can appropriately manage data including information beneficial in using the target apparatus on the IC tag embedded in the target apparatus. Therefore, according to one or more embodiments of the present invention, the data management device can be used in an apparatus user support system (for example, the error recovery support system 100) capable of reading useful information about the target apparatus by using a user support device such as a communication terminal.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS

1 data management device
2 IC tag (contactless storage medium)
3 RF reader/writer unit (RF reader unit)
5 control unit
6 storage unit
7 operation unit
8 display unit
9 apparatus function execution units
10 electronic apparatus
11 communication terminal
12 management server
13 operator terminal
14 wide area network
15 control unit
16 storage unit
17 touch panel
17*a* input unit
17*b* display unit
18 communication unit
19 voice call unit
20 apparatus function execution control unit
21 state detection unit
22 data selection unit
23 data management unit
24 state monitoring unit
25 state analyzing unit
30 apparatus function program
31 selection rule storage unit
32 data storage unit
33 state history storage unit
40 display control unit
41 input receiving unit
42 data transmission control unit
43 data acquisition control unit
100 error recovery support system (apparatus user support system)

The invention claimed is:
1. A data management device configured to manage data stored in a contactless storage medium mounted to an electronic apparatus, comprising:
 a controller comprising:
  data storage that stores a plurality of data units comprising information of the electronic apparatus;
  a state detector that detects a state of the electronic apparatus;
  a data selector that, by referring to selection rules associating states of the electronic apparatus with types of the data, selects data comprising information conforming with the electronic apparatus under a state detected by the state detector from the data storage; and
  a data manager that stores the data selected by the data selector in the contactless storage medium,
 wherein the state detector detects at least whether a state of the electronic apparatus is a normal operating state in which the electronic apparatus normally operates or an error state in which the electronic apparatus has an error, wherein the data selector selects instruction manual data comprising information indicating how to use the electronic apparatus when the state detector detects the normal state, and wherein the data selector selects error recovery guide data comprising information to recover from the error from the data storage by referring to the selection rules when the state detector detects the error state.

2. The data management device according to claim 1, wherein the data storage stores the error recovery guide data for each type of errors to occur in the electronic apparatus, and wherein the state detector identifies, the type of the errors which occur when the electronic apparatus is in the error state, and wherein the data selector selects error recovery guide data comprising information to recover from the type of error identified by the state detector from the data storage unit by referring to the selection rules.

3. The data management device according to claim 1, wherein the state detection unit obtains transitions of the state of the electronic apparatus by continuously monitoring the electronic apparatus, wherein the state detector comprises a state analyzer that regularly detects a state reflecting a long-term tendency of the electronic apparatus by analyzing the obtained transitions of the state, wherein, every time the state analyzer detects the state reflecting a long-term tendency, the data selector selects data conforming with the detected state from the data storage by referring to the selection rules, and wherein the data manager stores the selected data in the contactless storage medium.

4. The data management device according to claim 1, wherein, when the state of the electronic apparatus transitions to another state, the state detector detects the state of the electronic apparatus after the transition, wherein, every time the state detector detects the state after the transition, the data selector selects data conforming with the detected state after the transition from the data storage by referring to the selection rules, and wherein the data manager stores the selected data in the contactless storage medium.

5. The data management device according to claim 1, wherein the data management stores a state history indicating the transitions of the state of the electrical apparatus detected by the state detector in the contactless storage medium.

6. An electronic apparatus comprising:
a data management device according to claim 1.

7. An apparatus user support system comprising:
an electronic apparatus comprising a data management device according to claim 1; and
a communication terminal comprising an RF reader configured to read data from a contactless storage medium mounted to the electronic apparatus.

8. A data management method for managing data stored in a contactless storage medium mounted to an electronic apparatus, wherein the electronic apparatus comprises a data storage configured to store a plurality of data units comprising information of the electronic apparatus, comprising:
a state detection step of detecting a state of the electronic apparatus;
a data selection step of, by referring to selection rules associating states of the electronic apparatus with types of the data, selecting data comprising information conforming with the electronic apparatus under a state detected in the state detection step from the data storage; and
a data storing step of storing the data selected in the data selection step in the contactless storage medium, wherein the state detection step comprises detecting at least whether a state of the electronic apparatus is a normal operating state in which the electronic apparatus normally operates or an error state in which the electronic apparatus has an error, wherein the data selecting step comprises selecting instruction manual data comprising information indicating how to use the electronic apparatus when the normal state is detected, and wherein the data selecting step comprises selecting error recovery guide data comprising information to recover from the error from the data storage by referring to the selection rules when the error state is detected.

9. A control program stored on a non-transitory computer-readable medium that causes a computer to function as respective units of a data management device according to claim 1.

10. The data management device according to claim 1, wherein the state detector obtains transitions of the state of the electronic apparatus by continuously monitoring the electronic apparatus, wherein the state detector comprises a state analyzer that regularly detects a state reflecting a long-term tendency of the electronic apparatus by analyzing the obtained transitions of the state, wherein, every time the state analyzer detects the state reflecting a long-term tendency, the data selector selects data conforming with the detected state from the data storage by referring to the selection rules, and wherein the data manager stores the selected data in the contactless storage medium.

11. The data management device according to claim 2, wherein the state detector obtains transitions of the state of the electronic apparatus by continuously monitoring the electronic apparatus, wherein the state detector comprises a state analyzer that regularly detects a state reflecting a long-term tendency of the electronic apparatus by analyzing the obtained transitions of the state, wherein, every time the state analyzer detects the state reflecting a long-term tendency, the data selector selects data conforming with the detected state from the data storage by referring to the selection rules, and wherein the data manager stores the selected data in the contactless storage medium.

12. The data management device according to claim 1, wherein, when the state of the electronic apparatus transitions to another state, the state detector detects the state of the electronic apparatus after the transition, wherein, every time the state detector detects the state after the transition, the data selector selects data conforming with the detected state after the transition from the data storage by referring to the selection rules, and wherein the data manager stores the selected data in the contactless storage medium.

13. The data management device according to claim 2,
wherein, when the state of the electronic apparatus transitions to another state, the state detector detects the state of the electronic apparatus after the transition,
wherein, every time the state detector detects the state after the transition, the data selector selects data conforming with the detected state after the transition from the data storage by referring to the selection rules, and
wherein the data manager stores the selected data in the contactless storage medium.

14. The data management device according to claim 3,
wherein, when the state of the electronic apparatus transitions to another state, the state detector detects the state of the electronic apparatus after the transition,
wherein, every time the state detector detection unit detects the state after the transition, the data selector selects data conforming with the detected state after the transition from the data storage by referring to the selection rules, and
wherein the datamanager stores the selected data in the contactless storage medium.

15. The data management device according to claim 1,
wherein the data manager stores a state history indicating the transitions of the state of the electrical apparatus detected by the state detector in the contactless storage medium.

16. The data management device according to claim 2,
wherein the data manager stores a state history indicating the transitions of the state of the electrical apparatus detected by the state detector in the contactless storage medium.

17. The data management device according to claim 3,
wherein the data manager stores a state history indicating the transitions of the state of the electrical apparatus detected by the state detector in the contactless storage medium.

18. The data management device according to claim 4,
wherein the datamanager stores a state history indicating the transitions of the state of the electrical apparatus detected by the state detector in the contactless storage medium.

* * * * *